United States Patent
Ito et al.

(10) Patent No.: US 8,122,002 B2
(45) Date of Patent: Feb. 21, 2012

(54) INFORMATION PROCESSING DEVICE, INFORMATION PROCESSING METHOD, AND PROGRAM

(75) Inventors: Masato Ito, Tokyo (JP); Kenichi Hidai, Tokyo (JP); Katsuki Minamino, Tokyo (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 12/335,127

(22) Filed: Dec. 15, 2008

(65) Prior Publication Data

US 2009/0157634 A1 Jun. 18, 2009

(30) Foreign Application Priority Data

Dec. 17, 2007 (JP) ................... 2007-324379

(51) Int. Cl.
*G06F 17/30* (2006.01)
(52) U.S. Cl. ........................................ 707/707
(58) Field of Classification Search .............. 707/707, 707/999.3
See application file for complete search history.

(56) References Cited

U.S. PATENT DOCUMENTS

| | | | |
|---|---|---|---|
| 6,715,081 B1 * | 3/2004 | Attwood et al. | 1/1 |
| 7,917,490 B2 * | 3/2011 | Norris et al. | 707/707 |
| 2006/0129533 A1 * | 6/2006 | Purvis | 707/3 |
| 2007/0244872 A1 * | 10/2007 | Hancock | 707/3 |
| 2009/0055384 A1 * | 2/2009 | Jain et al. | 707/5 |
| 2009/0287649 A1 * | 11/2009 | Park | 707/3 |

FOREIGN PATENT DOCUMENTS

| | | |
|---|---|---|
| JP | 2002 342380 | 11/2002 |
| JP | 2004 21763 | 1/2004 |

* cited by examiner

*Primary Examiner* — John R. Cottingham
*Assistant Examiner* — Noosha Arjomandi
(74) *Attorney, Agent, or Firm* — Frommer Lawrence & Haug LLP; William S. Frommer; Paul A. Levy

(57) ABSTRACT

An information processing device includes an obtaining unit to obtain two pieces of information that are targets for searching for connections; a connection searching unit to use an action model wherein the manner of obtaining, from input information, obtain related information that relates to the input information is modeled, and find connection information to connect the two pieces of information, thereby searching connections between the two pieces of information; and a search result output unit to output the search results of the connections between the two pieces of information.

13 Claims, 24 Drawing Sheets

FIG. 22
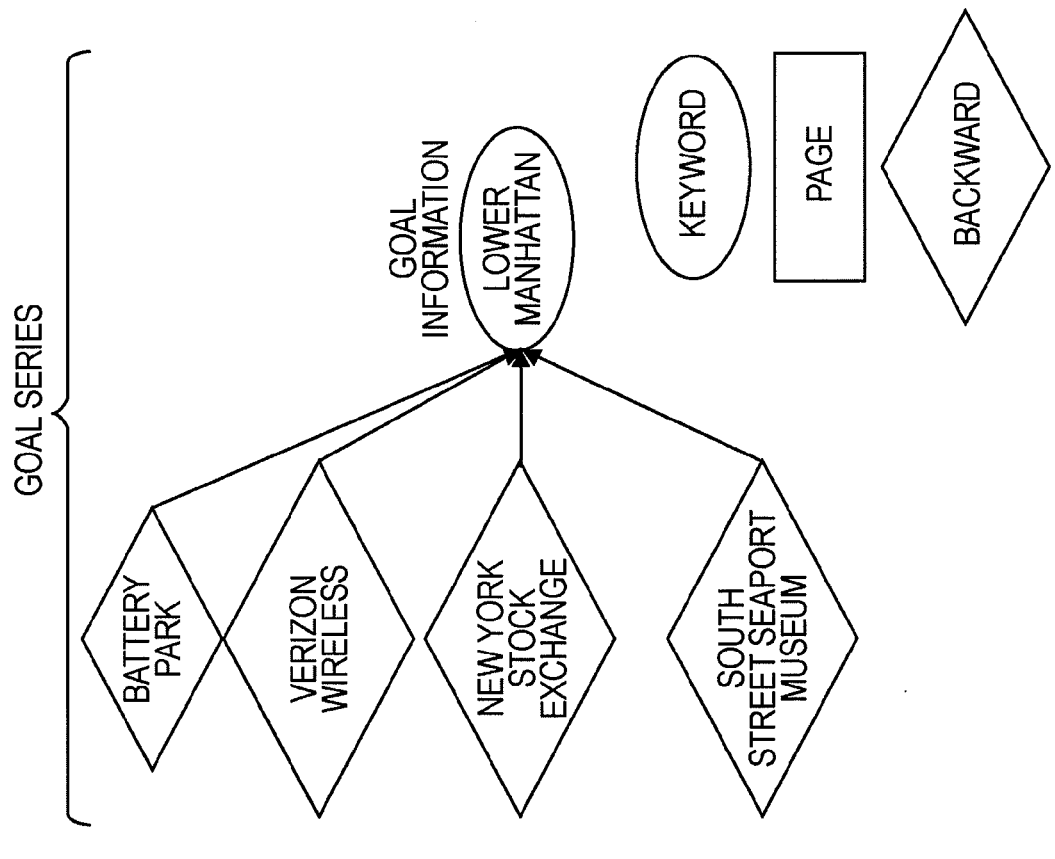
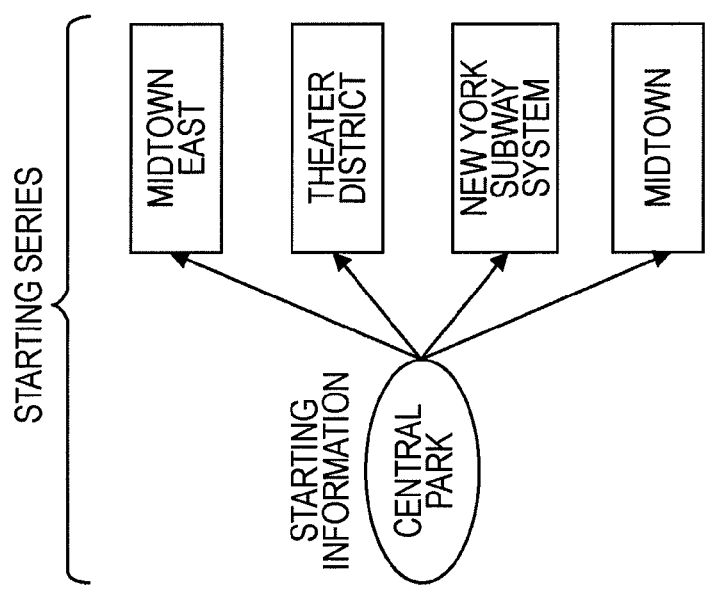

INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2007-324379 filed in the Japanese Patent Office on Dec. 17, 2007, the entire contents of which are incorporated herein by reference.

BACKGROUND OF THE INVENTION

1. Field of the Invention

The present invention relates to an information processing device, information processing method, and program, and in particular relates to an information processing device, information processing method, and program to enable searching for appropriate connections between two pieces of information, for example.

2. Description of the Related Art

For example, with a search engine provided with a web page on the Internet, upon a user inputting information such as a word or the like, the information thereof is used as a keyword to search for a web page with information including such keyword.

"Certain information", when obtaining information relating to such information such as of a search or the like from certain information, (using certain information), is also called input information, and is obtained from input information. Information relating to such input information is also called related information.

With a search engine, a word or the like serving as a keyword is used as input information, and a web page including the keyword is obtained as related information. If two pieces of information, such as two words or the like, are input as to the search engine on the web page, the two pieces of information are each used as a keyword, and a web page including the two keywords are searched.

Accordingly, it is difficult to search for a connection (relationship) between two pieces of information using a search engine on a web page, i.e. for example, connection information such as restaurants that can be visited while traveling between a certain location (e.g. Central Park) and another location (e.g. Lower Manhattan), or a connection between two apparently unrelated companies (e.g. American Express, which is famous in the financial field and Verizon, which is famous in the telecommunications field).

Therefore, a text mining method has been proposed (e.g. Japanese Unexamined Patent Application Publication No. 2004-021763) wherein a relevance table is created to register the relevance between words based on the co-occurrence of words making up a text, and using the relevance table, a path of related words from a first keyword to a second keyword is found and displayed.

SUMMARY OF THE INVENTION

There are cases wherein words are related, even when there is no co-occurrence or the relational information is weak. That is to say, for example with so-called web surfing actions, a user inputs certain information into a search engine, searches a web page including that information, views the web page, and further goes to another web page at a link destination for which link is posted from the web page, and views the other web page, or alternatively repeats the actions of selecting information from within a web page, inputting the information thereof into a search engine, and searching and viewing the web pages that include such information.

With the above-described web surfing, there is no guarantee that there will be co-occurrence every time between information input in the search engine and web pages that the search engine search from such information and the user views, or between a web page and a web page for which a link is posted and the user views, or between a web page and information that the user selects from such web page to input in the search engine.

However, in the case that a user inputs certain information in a search engine and searches for a web page including such information, and views such web page, even if there is no no-occurrence between the information input in the search engine and the web page viewed by the user, there should be some relation or other that connects the information and the web page, so including such relation, rather than searching for a connection between the two pieces of information, an appropriate connection of the two pieces of information can be obtained.

There has been recognized demand to enable searching for an appropriate connection between two pieces of information.

An information processing device or program according to an embodiment of the present invention is an information processing device or a program to cause a computer serving as an information processing device to function, and includes an obtaining unit to obtain two pieces of information that are targets for searching for connections; a connection searching unit to use an action model wherein the manner of obtaining, from input information, to obtain related information that relates to the input information is modeled, and find connection information to connect the two pieces of information, thereby searching connections between the two pieces of information; and a search result output unit to output the search results of the connections between the two pieces of information.

An information processing method according to an embodiment of the present invention is an information processing method for an information processing device to perform processing including the steps of: obtaining two pieces of information that are targets for searching for connections; searching for connections between the two pieces of information by a user using an action model wherein the manner of obtaining, from input information, to obtain related information that relates to the input information is modeled, and finding connection information to connect the two pieces of information; and outputting the search results of the connections between the two pieces of information.

With the configurations described above, two pieces of information that are targets for searching for connections are obtained, and searching is performed for the connections between the two pieces of information by a user using an action model wherein the manner of obtaining, from input information, to obtain related information that relates to the input information is modeled, and finding connection information to connect the two pieces of information.

Note that a program can be provided by being transmitted via a transmission medium, or by being recorded onto a recording medium.

Also, the information processing device may be arranged as an independent device, or may be an internal block making up a device.

According to an embodiment of the present invention, appropriate connections for two pieces of information can be searched.

BRIEF DESCRIPTION OF THE DRAWINGS

FIG. 22 is a diagram illustrating an example of starting series and goal series;

DESCRIPTION OF THE PREFERRED EMBODIMENTS

Figure 1:
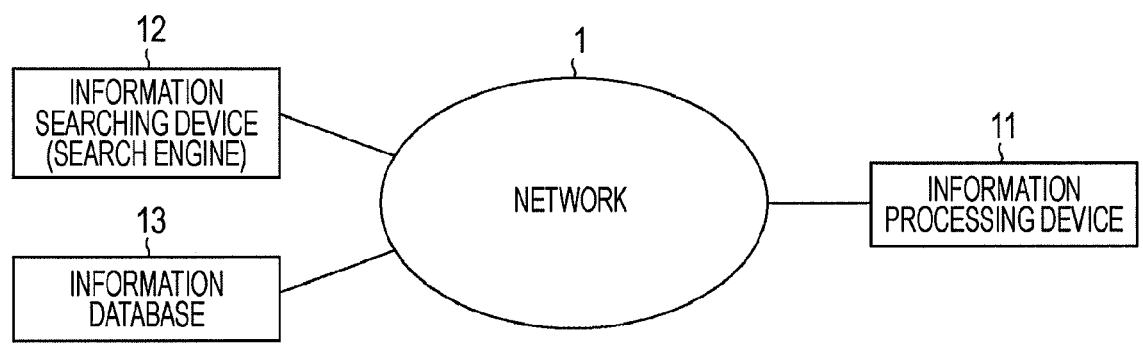
FIG. 1 is a diagram illustrating a configuration example of an information processing system to which an embodiment of the present invention has been applied.

FIG. 1 shows a configuration example of an information processing system (system refers to a logical collection of multiple devices, and whether each configuring device is within the same casing or not is not of concern) to which an embodiment of the present invention has been applied. In FIG. 1, the information processing system is made up of an information processing device 11, information searching device 12, and information database 13, and the information processing device 11, information searching device 12, and information database 13 are connected to a network 1 such as the Internet or the like.

Upon the user or the like of the information processing device 11 inputting two pieces of information subject to a search for a connection (hereafter also called search target information), the information processing device 11 performs searching processing by obtaining the search target information of the two pieces of information, searching for a connection between the two pieces of search target information using a later-described action model, and displaying the search result thereof as output.

Note that in order to search for a connection between the two pieces of search target information, the information processing device 11 requests an information search from the information searching device 12 via the network 1, or accesses the information database 13 to search for information.

The information searching device 12 is a search engine provided on a web page (e.g. a search engine such as Google or the like), for example, and a web page including a predetermined text string is searched, for example, in accordance with a request from the information processing device 11, and the search results thereof are transmitted to the information processing device 11 via the network 1.

The information database 13 is the WWW (World Wide Web), for example, i.e., a so-called collection of pages. The information searching device 12 searches for web pages from the information database 13, for example.

Figure 2:
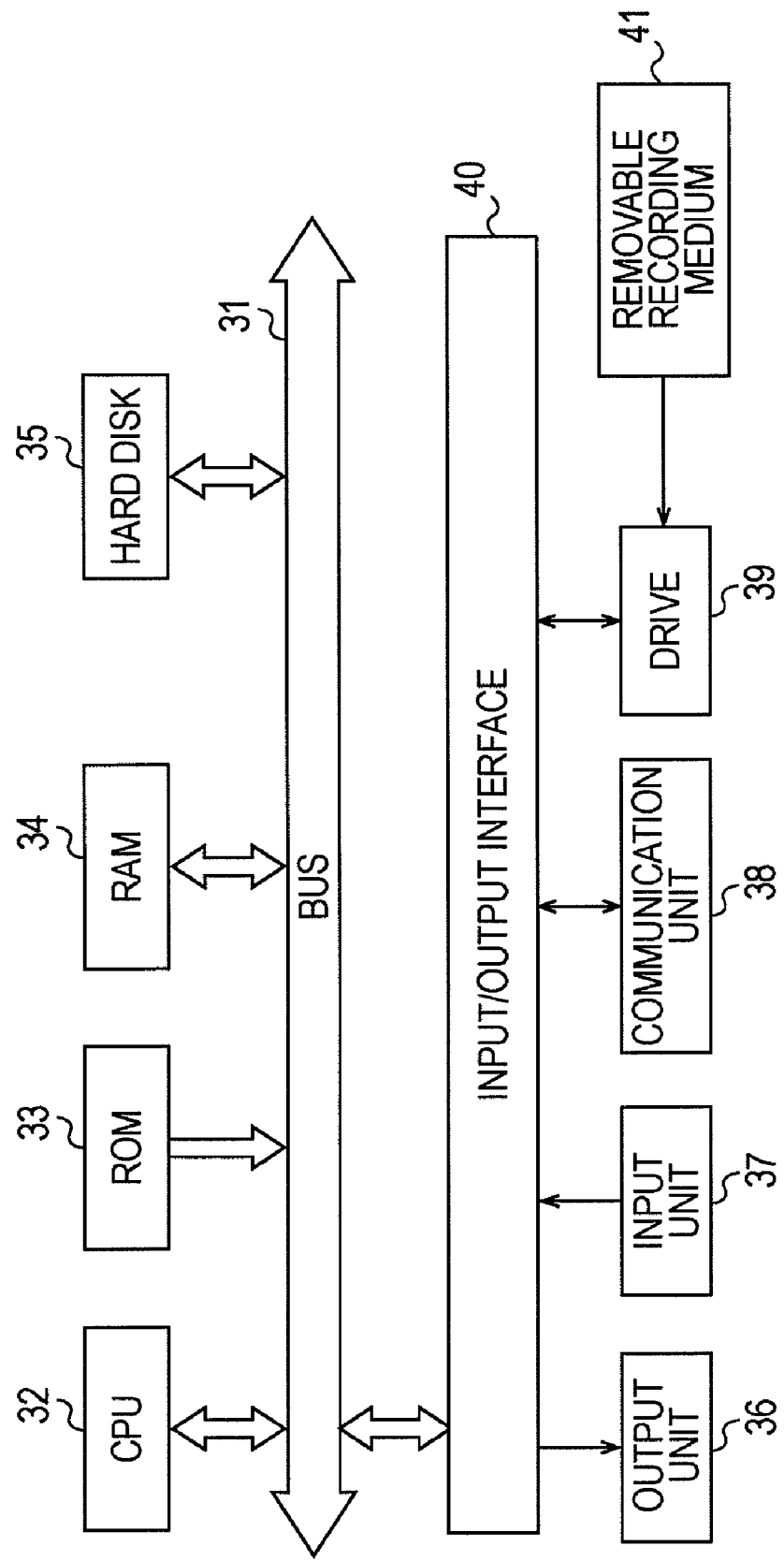
FIG. 2 is a block diagram illustrating a configuration example of hardware of an information processing device.

FIG. 2 illustrates a hardware configuration example of the information processing device 11 in FIG. 1. The information processing device 11 is a computer (PC), and has a CPU (Central Processing Unit) 32 built therein.

The CPU 32 is connected to a ROM (Read Only Memory) 33, RAM (Random Access Memory) 34, hard disk 35, and input/output interface 40, via a bus 31. The CPU 32 loads programs stored in the ROM 33 or programs stored in the hard disk 35 in the RAM 34 and executes, and thus performs processing according to a later-described flowchart and processing performed with a configuration of a later-described block diagram.

The ROM 33 stores programs (including data used) that the CPU 32 executes. The RAM 34 temporarily stores programs that the CPU 32 executes and data used in operation of the CPU 32. The hard disk 35 stores programs that the CPU 32 executes and also the data.

An output unit 36 is made up of a LCD (Liquid Crystal Display), speaker, and so forth, and performs display of images and output of audio in accordance with control by the CPU 32.

An input unit 37 is made up of a keyboard, mouse, microphone, and so forth. The input unit 37 is operated by a user of the information processing device 11, whereby instructions and other information are supplied to the CPU 32 from the input unit 37 via the input/output interface 40 and bus 31.

A communication unit 38 is made up of a network interface and so forth, and controls the communication via the network 1.

A drive 39 drives a removable recording medium 41 such as a flexible disk, CD-ROM (Compact Disc Read Only Memory), MO (Magneto Optical) disk, DVD (Digital Versatile Disc), magnetic disk, semiconductor memory and so forth, and performs control of recording and playing (readout) of the data and so forth as to the removable recording medium 41.

An input/output interface 40 functions as an interface to connect the output unit 36, input unit 37, communication unit 38, drive 39, and other peripheral devices to the bus 31.

Note that the program executed by the CPU 32 can be recorded beforehand in the hard disk 35 and ROM 33 serving as recording media built into the information processing device 11 which is a computer. Alternatively, the program can be temporarily or permanently stored (recorded) in the removable recording medium 41. Such a removable recording medium 41 can be provided as so-called packaged software.

The program can be installed in an information processing device 11 which is a computer from the removable recording medium 41. Also, the program can be transferred wirelessly from a download site, via an artificial satellite for digital satellite broadcasting, to the information processing device 11, or can be transferred to the information processing device 11 by cable via the network 1, whereby a program thus transferred can be received with the communication unit 38 of the information processing device 11 and installed in the hard disk 35 built therein.

Next, as described above, the information processing device 11 obtains two pieces of search target information, and using an action model searches for a connection between the two pieces of search target information, and performs searching processing to output the search results thereof.

An overview of the searching processing performed by the information processing device 11 will be described with reference to FIG. 3, and terminology used hereafter will also be described.

Figure 3:
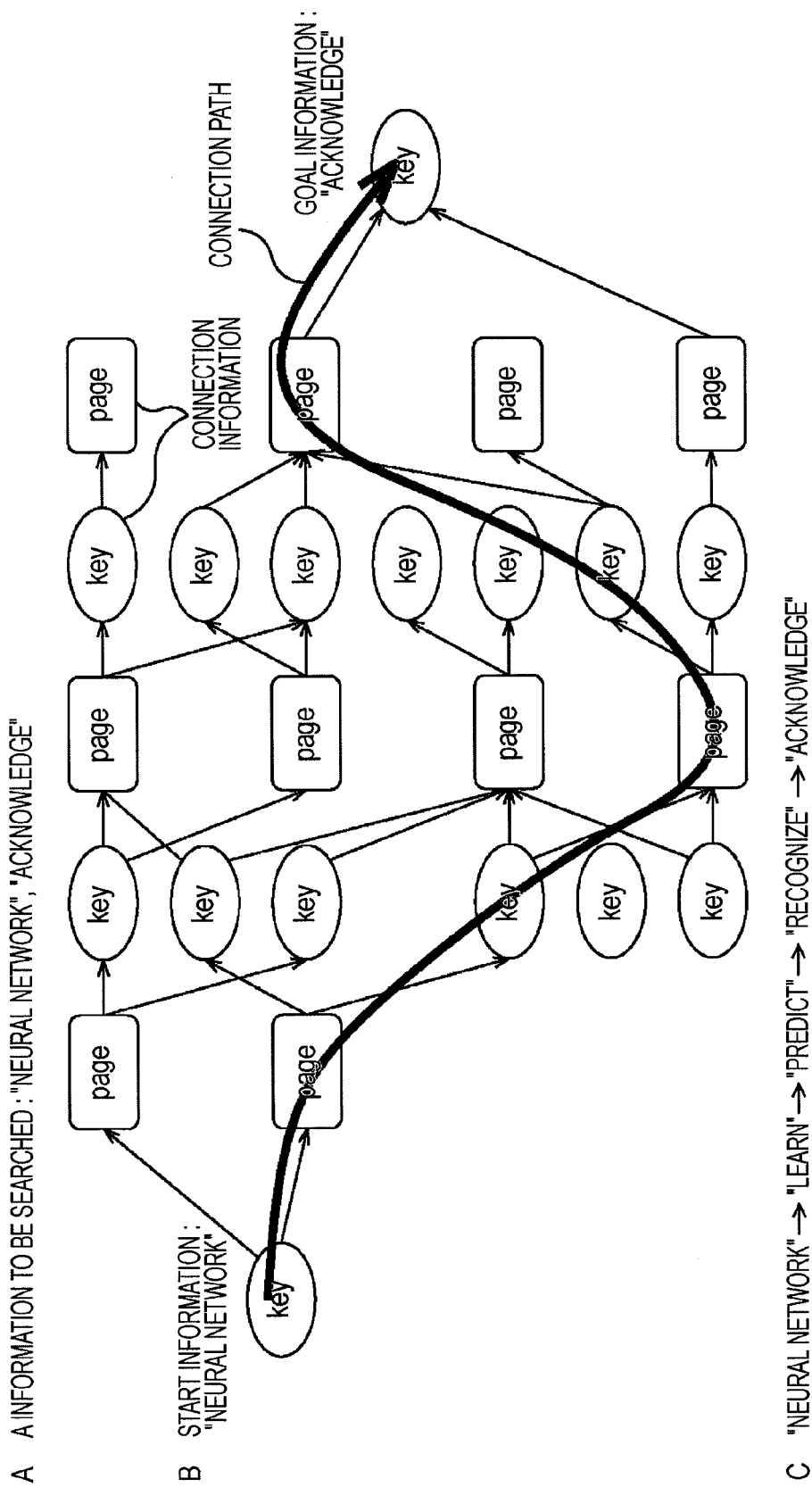
FIG. 3 is a diagram to schematically describe search processing performed by the information processing device.

A in FIG. 3 shows an example of the two pieces of search target information. In A in FIG. 3, the words "neural network" and "acknowledge" are the search target information. Words to use for search target information can be arbitrary words expressing physical objects, non-physical object, concepts, and so forth. Also, the search target information is not limited to words, but may be phrases, sentences, and other text strings and so forth.

B in FIG. 3 shows an example of (a graphical expression) of an action plan in the case that the words "neural network" and "acknowledge" are the search target information. "Action plan" here refers to a connection information series (tree) (graph). Also, "connection information" is information in order to connect two pieces of search target information, and are configuration elements of the action plan. Note that the search target information is also included in the connection information.

With the present embodiment, let us say that the information serving as connection information is a text string provided as a keyword to the search engine (hereafter, also called a search text string), and a web page. In B in FIG. 3, page indicates a web page, and key indicates a search text string provided to the search engine as a keyword.

With the searching processing, finding new connection information to connect to the connection information as an initial value of the connection information is repeated for each of the two pieces of search target information, whereby a connection information series including the two pieces of search target information, i.e. the action plan such as shown in B in FIG. 3, is searched as connections between the two pieces of search target information.

That is to say, with the searching processing, one of the two pieces of search target information becomes starting information which is information at the start (starting point) of the connection (action plan), and the other becomes goal information which is the goal (ending point) information of the connection, and by finding starting information with new connection information that connects to the connecting information serving as an initial value of the connection information, the starting information processing making up the starting series, which is connection information series including starting information, is performed.

Specifically, with the starting information processing, first, the starting information is included in (a variable expressing) the starting series initialized in an empty set, and is select as a connection search target.

A "connection search target" is connection information subject to obtain connection information (new connection information) that connects to the connection information out of the action plan connection information. Immediately following starting the starting information processing, the starting information is selected as the connection search target.

Upon the connection search target being selected, information obtained by some action or another is obtained as candidate information which is a candidate to be new connection information that connects to the connection search target.

"Action" is an action to obtain related information from certain input information relating to such input information (related information corresponding to input information).

There are three types of actions, e.g. search action, link action, and keyword action. With a search text string such as a word serving as input information, "search action" is an action of searching a web page (a web page including a keyword) wherein the search text string is a keyword, and obtaining this as related information. With a web page serving as input information, "link action" is an action of selecting a link within the web page by clicking the link, and obtaining the web page of the link destination as related information. With a web page serving as input information, "keyword action" is an action of selecting a text string such as a word within the web page to serve as a keyword used for searching (select the text string within the web page as the keyword).

Note that for an action method when obtaining the (candidate information of the) new connection information that connects to the connection search target, there are two methods, namely a forward action and a backward action. "Forward action" is an action performed with the connection search target as input information, and related information corresponding to the input information is obtained as the new connection information that connects to the connection search target. "Backward action" is an action performed with the connection search target as related information, and input information corresponding to the related information is obtained as new connection information that connects to the connection search target.

Upon a candidate for new connection information that connects to the connection search target (candidate information) being obtained, with the searching processing, new connection information that connects to the connection search target is selected from the candidate information, and is included in the starting series.

Further, the connection search target is selected from the new connection information included in the starting series, and thereafter similar processing is repeated.

In B in FIG. 3, out of the two pieces of search target information "neural network" and "acknowledge", the search target information "neural network" is set as the starting information, and the search target information "acknowledge" is set as the goal information, whereby starting information processing is performed.

That is to say, the starting information "neural network" is included in the starting series while being selected for a connection search target, a web page (page) serving as the information obtained by a search action is obtained as candidate information as to the connection search target, and two web pages (page) are selected as new connection information from the candidate information and included in the starting series.

Further, all of the two web pages (page) serving as new connection information included in the starting series is selected as connection search targets, a search text string (key) serving as information obtained by a keyword action is obtained as candidate information as to the web page (page) serving as the connection search target, and six target strings (key) serving as new connection information are selected from the candidate information and included in the starting series.

Hereafter, similar processing is repeatedly performed, and upon information matching the goal information "acknowledge" appearing as new connection information in the starting series, the starting information processing is ended, and in the searching processing, the starting series obtained by the starting information processing, i.e. an action plan which is a connection information series that connects the starting information "neural network" and goal information "acknowledge" as shows in B in FIG. 3 is displayed.

Note that in the action plan display, as shown in B in FIG. 3, along with the connection information series obtained in the starting information processing, a path (bold arrow in B in FIG. 3) from the starting information "neural network" to the goal information "acknowledge" (hereafter also called a connection path) can be displayed.

Also, in the case that there are multiple paths serving as paths from the starting information "neural network" to the goal information "acknowledge", one or two of the paths can be selected and displayed, or all can be displayed.

C in FIG. 3 shows an example of a connection information series along the connection path. With the connection information series in C in FIG. 3, the search text string "neural network" which is the starting information, a web page relating to "learning" of the neural network, the search text string "predict" which shows predicting by the neural network, a web page relating to "recognizing" by the neural network, and the search text string "acknowledge" which is the goal information, are connected in the order thereof.

According to this series of connection information, regarding the search target information "neural network" and "acknowledge", the "neural network" performs "learning", and thus can "predict" future inputs, and further, with a small prediction error as to actual input serving as a standard (measurement), the input can be "recognized". We can see that there is a connection wherein, by applying the "neural network" to a robot, the equivalent of a person "recognizing", which is seeing an object and determining/comprehending what the object is, can be performed by a robot.

Figure 4:
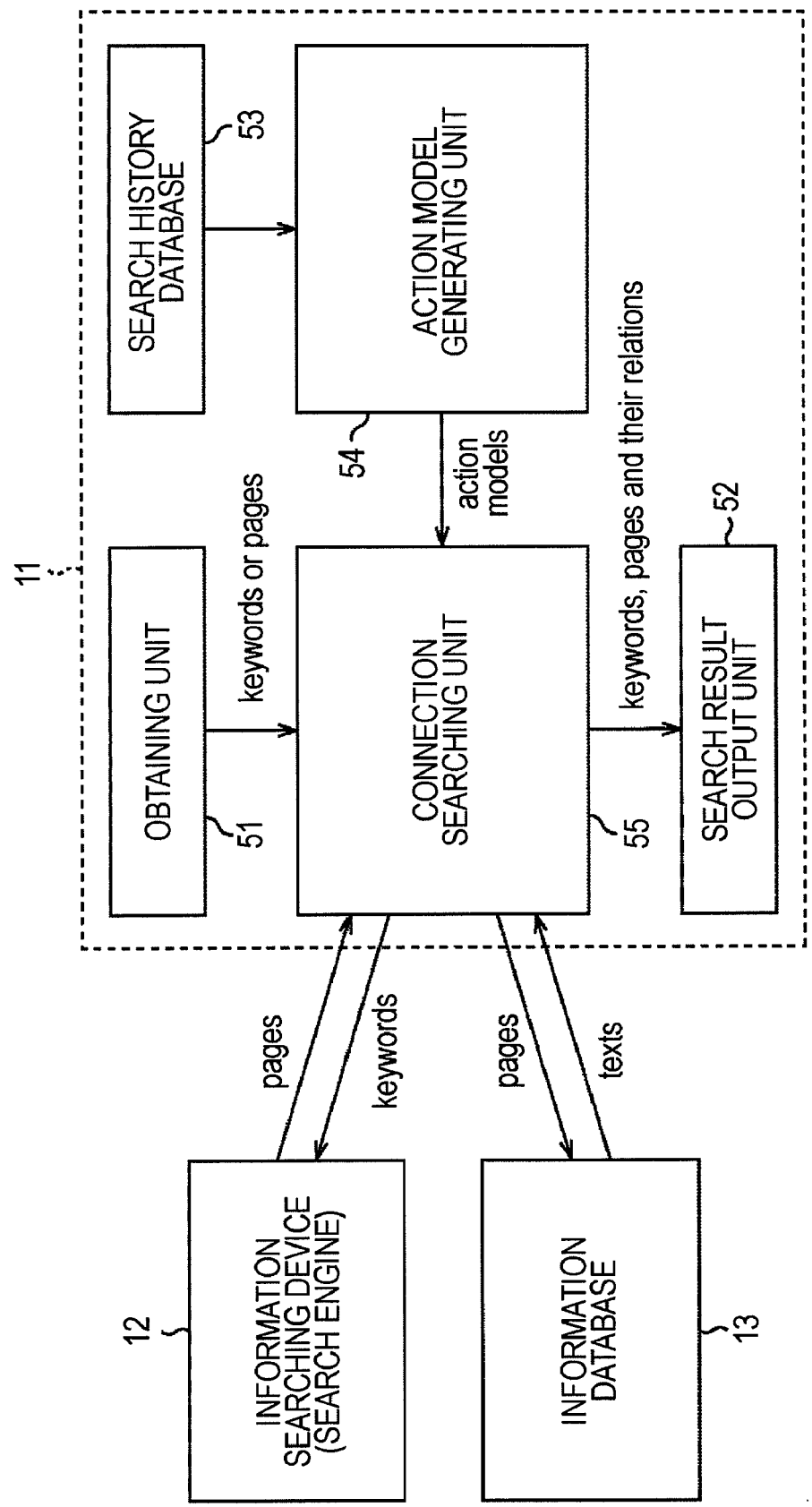
FIG. 4 is a block diagram illustrating a functional configuration example of the information processing device.

Next, FIG. 4 is a block diagram showing a functional configuration example of the information processing device 11 in FIG. 1. With the information processing device 11, the functional configuration in FIG. 4 can be realized equivalently by the CPU 32 (FIG. 2) executing a program. In FIG. 4, the information processing device 11 is made up from an obtaining unit 51, search result output unit 52, search history database 53, action model generating unit 54, and connection searching unit 55.

The obtaining unit 51 obtains the two pieces of search object information for the user of the information processing device 11 operating in the input unit 37 (FIG. 2) to input, and one of the two pieces of search target information is supplied to the connection searching unit 55 as the starting information while the other is supplied as the goal information.

With the obtaining unit 51, the search target information input first, for example, of the two pieces of search target information is set as starting information, and the search target information input later is set as the goal information.

The search result output unit 52 outputs the connection search results of the two pieces of search target information that the connection searching unit 55 outputs, by displaying on the output unit 36 and so forth, for example.

The search history database 53 stores data of history of user actions (hereafter also called historical data) to obtain, for example, information by search actions, link action, and keyword actions performed by an unspecified large number of users.

That is to say, historical data for search actions of users (an unspecified large number of users) obtaining web pages by searching for a web page from a keyword, keyword actions of using obtaining information set as search keywords by selecting information to set as search keywords from information on the web pages, and link actions of users to obtaining web pages at link destinations by selecting links on the web pages, is stored in the search history database 53.

Specifically, for example, let us say that a certain user inputs a search text string $key_1$ as the keyword, as a first action, and performs a search action to search for and view (obtain) a web page $page_2$ from the keyword with the search engine.

Further, let us say that the user selects a link on the web page $page_2$ as a second action, and performs a link action to view a web page $page_3$ of the link destination, and next, as a third action, performs a keyword action to select the information to set as a search keyword from the information (search text string) on the web page $page_3$.

Subsequently, let us say that as a fourth action, the user inputs a search text string $key_4$ as a keyword in the search engine, and performs a search action to search and view a web page $page_5$ from the keyword, and further performs actions as appropriate.

In this case, time series data, wherein information relating to user actions (search text strings and web pages) are arrayed in the order of action, are $key_1$, $page_2$, $page_3$, $key_4$, $page_5$, . . . but such time series data $key_1$, $page_2$, $page_3$, $key_4$, $page_5$, . . . is stored as historical data in the search history database 53. The subscript t (number) in the historical data $key_t$ and $page_t$ indicate the order in which the historical data $key_t$ and $page_t$ are obtained by actions, but if we consider that the historical data $key_t$ and $page_t$ are time series data, we can say that the point-in-time that the historical data $key_t$ and $page_t$ appear are shown.

Note that the historical data records the search text string input and web page information viewed by the user using a web browser, such web browser having an undetermined large number of users, for example, collects the information with a server on the Internet, and provides this to the information processing device 11.

The action model generating unit 54 generates and stores the action model. That is to say, the action model generating unit 54 uses the historical data stored in the search history database 53, performs learning of the action model and records the action model after such learning.

"Action model" as described here is a manner of obtaining related information from input information, i.e. a calculating model having modeled actions, and according to the present embodiment include a search action model which models search actions, a link action model which models link actions, and a keyword action model which models keyword actions.

The connection searching unit 55 uses the action model stored in the action model generating unit 54, and finds the connection information to connect the starting information and goal information which are the two pieces of search target information from the obtaining unit 51, thereby searching for a connection between the starting information and goal information, and supplies the search results to the search result output unit 52.

Note that in the case that the connection searching unit 55 cannot find the connection information using the action model, the connection searching unit 55 uses an information searching device 12 which is an external search engine or an external information database 13 to find connection information.

Figure 5:
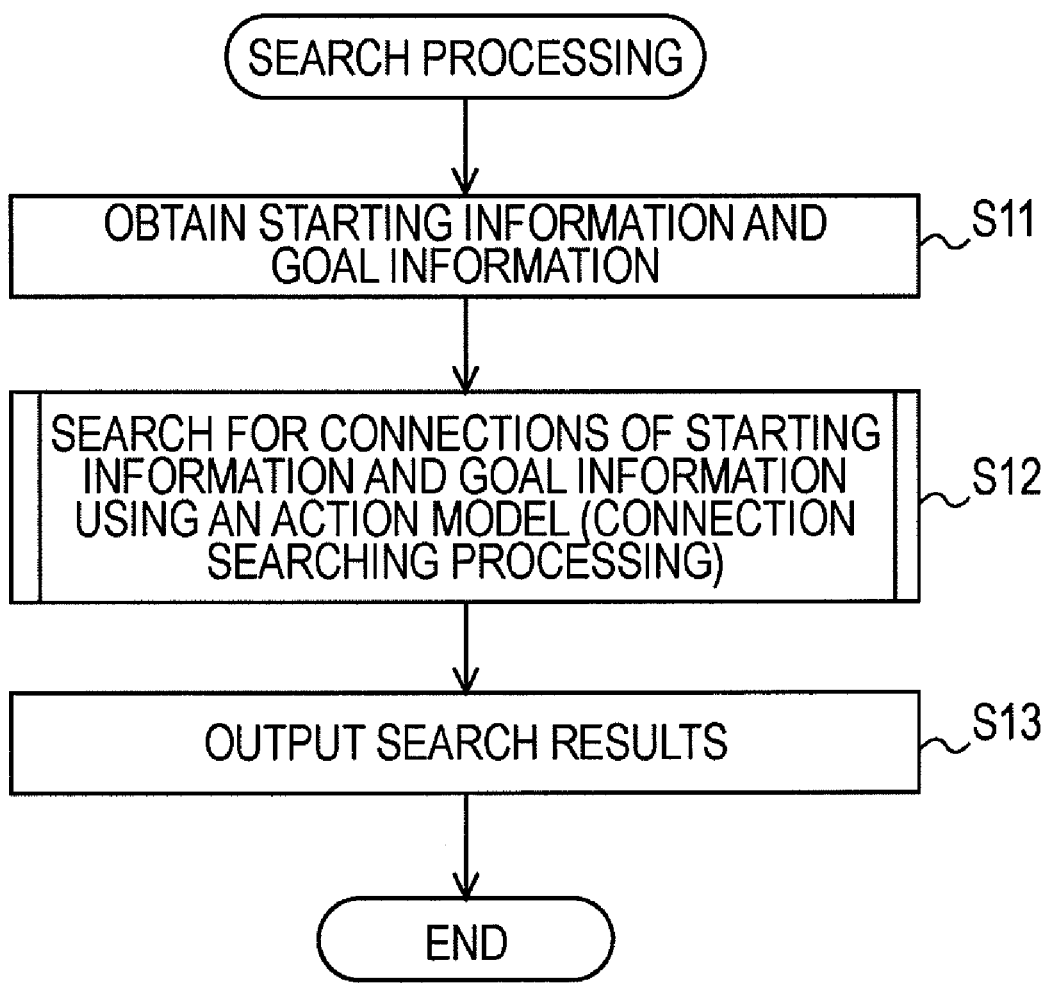
FIG. 5 is a flowchart describing searching processing.

Next, the search processing that the information processing device 11 in FIG. 4 performs will be described with reference to the flowchart in FIG. 5. Upon the user of the information processing device 11 operating the input unit 37 (FIG. 2) so as to input search target information, the obtaining unit 51 obtains the two pieces of search target information input by the input unit 37 being operated in step S11, and of the two pieces of search target information one is supplied to the connection searching unit 55 as the starting information and the other is supplied as goal information, and the flow is advanced to step S12.

In step S12, the connection searching unit 55 uses an action model stored in the action model generating unit 54, and finds the connection information to connect the starting information and goal information from the obtaining unit 51, thereby performing connection searching processing to search for a connection between the starting information and goal information, and outputs the search results obtained by the connection searching processing to the search result output unit 52, and the flow is advanced to step S13.

In step S13, the search result output unit 52 outputs by displaying the connection search result between the starting information and goal information from the connection searching unit 55, and the searching processing is ended.

Figure 6:
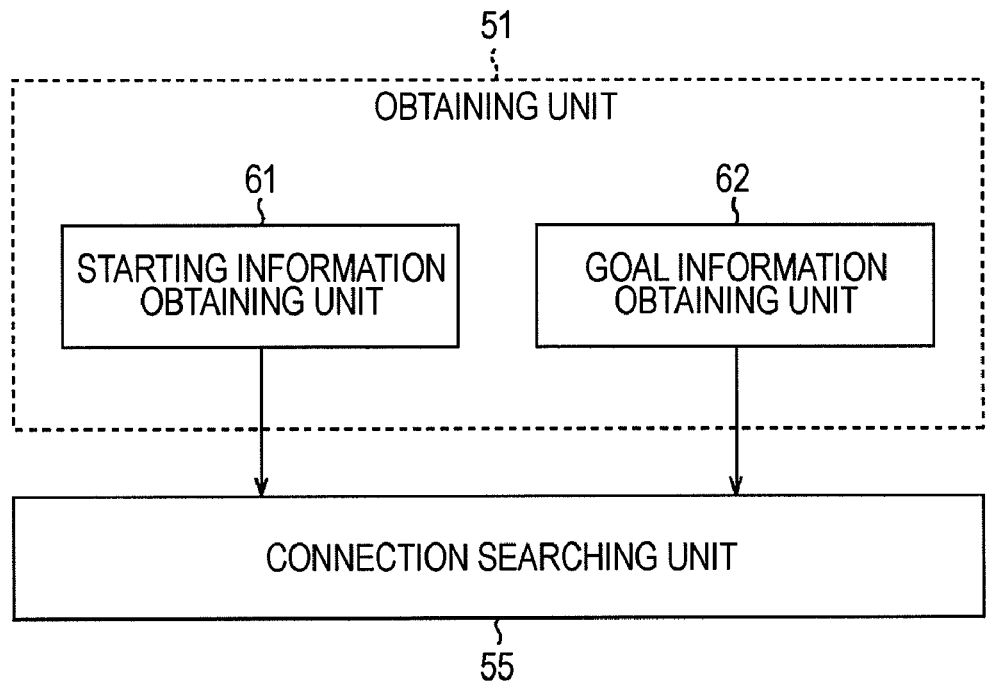
FIG. 6 is a block diagram illustrating a configuration example of an obtaining unit.

Next, FIG. 6 shows a configuration example of the obtaining unit 51 in FIG. 4. The obtaining unit 51 is made up of a starting information obtaining unit 61 and goal information obtaining unit 62.

The starting information obtaining unit 61 obtains the search target information that is input first, for example, from the two pieces of search target information input by the user of the information processing device 11 by operating the input unit 37 (FIG. 2), as the starting information, and supplies this to the connection searching unit 55.

The goal information obtaining unit 62 obtains the search target information that is input later, for example, from the two pieces of search target information input by the user of the information processing device 11 by operating the input unit 37, as the goal information, and supplies this to the connection searching unit 55.

Figure 7:
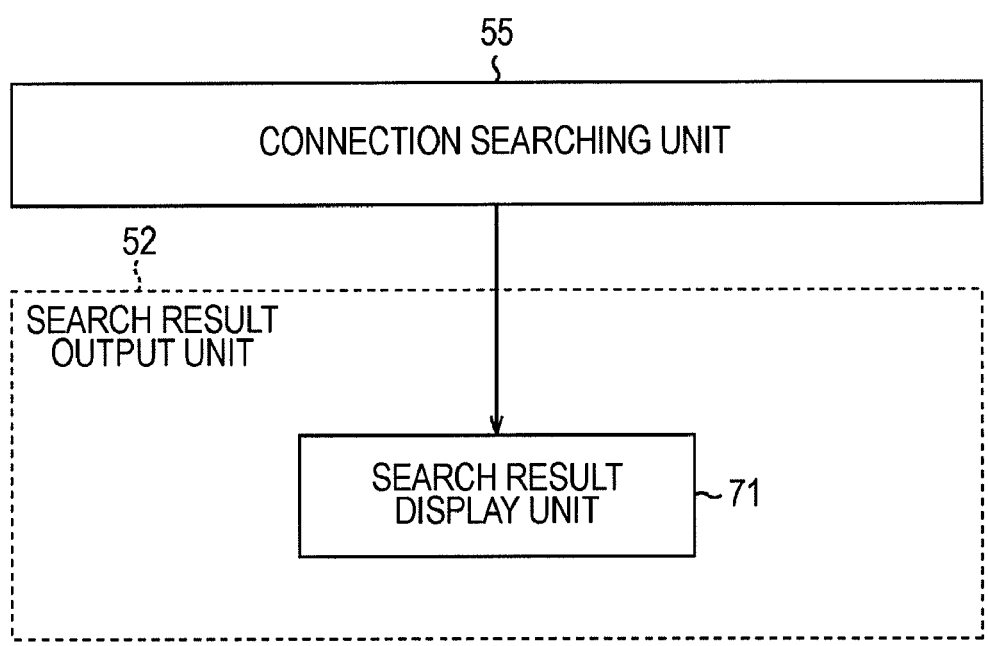
FIG. 7 is a block diagram illustrating a configuration example of a search result output unit.

FIG. 7 shows a configuration example of the search result output unit 52 in FIG. 4. The search result output unit 52 is made up of a search result display unit 71. The search result display unit 71 shows an action plan or the like as a connection searching result between the starting information and goal information supplied from the connection searching unit 55.

Figure 8:
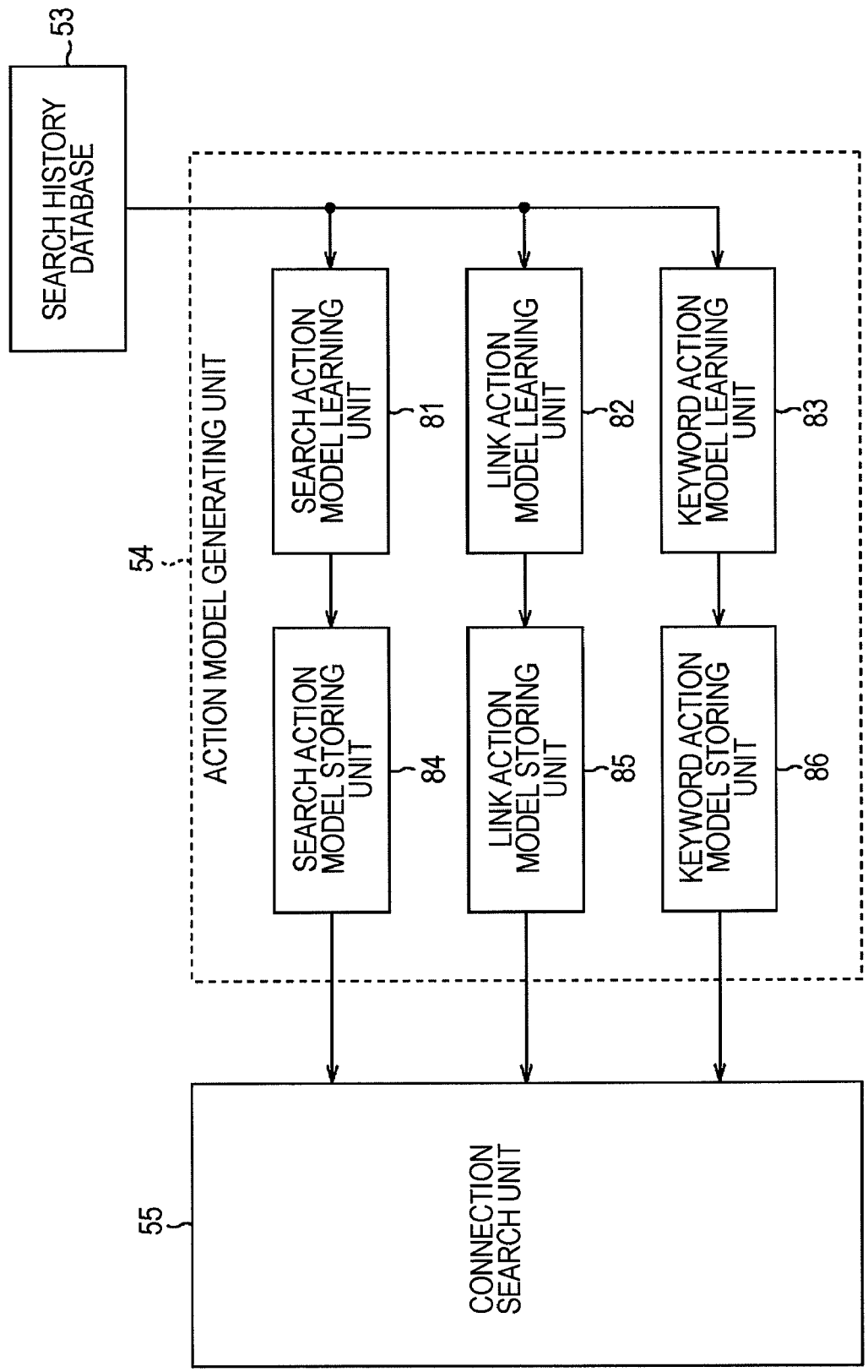
FIG. 8 is a block diagram illustrating a configuration example of an action model generating unit.

FIG. 8 shows a configuration example of the action model generating unit 54 in FIG. 4. The action model generating unit 54 is made up of a search action model learning unit 81, link action model learning unit 82, keyword action model learning unit 83, search action model storing unit 84, link action model storing unit 85, and keyword action model storing unit 86.

The search action model learning unit 81 uses historical data stored in the search history database 53 to perform learning of the search action model, and supplies the search action model after such learning to the search action model storing unit 84.

The search action model is a calculation model for a search action, i.e. an action to search for a web page (web page including a keyword $key_t$) $page_{t+1}$ with a search text string $key_t$ as input information using such search text string $key_t$ as the keyword and obtain this as related information. With the search action model learning, the relation between the search text string $key_t$ and the web page $page_{t+1}$ serving as the related information obtained as to the input information (related information corresponding to the input information thereof) is learned. That is to say, if outputting an output B as to an input A is expressed as A→B, with the search action model, for example $key_t \rightarrow page_{t+1}$ can be learned.

The link action model learning unit 82 uses the historical data stored in the search history database 53 to perform learning of the link action model, and supplies the link action model after such learning to the link action model storing unit 85.

The link action model is a calculation model for a link action, i.e. an action to select, by clicking, a link within a web page $page_t$ where the web page $page_t$ is input information, and obtain the web page $page_{t+1}$ at the link destination as related information. With the link action model learning, the relation between the web page $page_t$ serving as input information and the web page $page_{t+1}$ serving as the related information corresponding to the input information is learned. That is to say, if outputting an output B as to an input A is expressed as A→B, with the link action model, for example $page_t \rightarrow page_{t+1}$ can be learned.

The keyword action model learning unit 83 uses the historical data stored in the search history database 53 to perform learning of the keyword action model, and supplies the keyword action model after such learning to the keyword action model storing unit 86.

The keyword action model is a calculation model for a keyword action, i.e. an action to obtain a text string (search text string) $key_{t+1}$ such as a word within a web page $page_t$, where the web page $page_t$ is input information, as related information. With the keyword action model learning, the relation between the web page $page_t$ serving as input information and the text string $key_{t+1}$ serving as the related information corresponding to the input information is learned. That is to say, if outputting an output B as to an input A is expressed as A→B, with the keyword action model, for example $page_t \rightarrow key_{t+1}$ can be learned.

Note that an action model (search action model, link action model, and keyword action model) includes a calculation model to output related information corresponding to the input information as to the input of the input information (so-called forward model) and a calculation model to output the input information corresponding to the related information (so-called backward model).

According to an action model that is a forward model, related information can be found wherein certain information is obtained as input information that is obtained by an action performed, and according to an action model that is a backward model, input information can be found when an action obtaining certain information as related information is performed.

The search action model storing unit 84 stores a search action model from the search action model learning unit 81. The link action model storing unit 85 stores a link action model from the link action model learning unit 82. The keyword action model storing unit 86 stores a keyword action model from the keyword action model learning unit 83.

A dynamics model that can store dynamics, e.g. RNN (Recurrent Neural Network) and so forth, or a state transition model, e.g. HMM (Hidden Markov Model) and so forth, may be employed as action model to perform learning using historical data which is time-series data.

In the case of employing an RNN or HMM as an action model, a unique ID (Identification) is assigned to the search text string and web page serving as historical data (includes information to distinguish whether the information is a search text string or a web page), and the time-series of the ID or a time-series of bit string to express the ID is used as learning data used for learning with RNN and HMM, whereby learning with RNN and HMM is performed.

The RNN and HMM can be expressed with a function f( ), while the ID of the search text string $key_t$ and web page $page_t$ serving as historical data can be expressed a $key\_id_t$ and $page\_id_t$, respectfully, and the search action model (forward model) can be expressed with the expression $page\_id_{t+1}=f(key\_id_t)$. Also, the link action model (forward model) can be expressed with the expression $page\_id_{t+1}=f(page\_id_t)$, and the keyword action model (forward model) can be expressed with the expression $key\_id_{t+1}=f(key\_id_t)$.

With a calculation model that can perform learning of time-series data such as an RNN or HMM (hereafter also called time-series data learning model), output of a future point-in-time t+1 can be predicted, not only with input of the current point-in-time t, but also by taking into account and learning the input of the past points-in-time t−1, t−2, and so on.

Accordingly, in the casing of employing a time-series data learning model as an action model, even if the search text string $key_t$ or web page $page_t$ serving as the current input information is the same, a different search text string $key_{t+1}$ or web page $page_{t+1}$ can be output as related information, depending on what sort of search text string or web page had been obtained previously.

Also, according to an RNN or HMM, multiple related information candidates serving as related information corresponding to the input information can be output with consideration for statistical properties thereof.

That is to say, for example with an RNN, a large number of RNNs are prepared, and one RNN is assigned to each string of historical data (one piece of time-series data) $key_1$, $page_2$, $page_3$, $key_4$, $page_5$, and so forth (with no distinction between search action, link action, or keyword action). Learning is performed herein with a search text string of the current point-in-time t through $t_0 (t > t_0)$ or a time-series string of a web page serving as input information, and a search text string of the next point-in-time t+1 through $t_0+1$ or a predicting value of a time-series string of a web page serving as related information, whereby when the search text string of the time t through $t_0$ or time-series string of a web page is provided as input information, the search text string of next point-in-time t+1 through $t_0+1$ or a predicting value of a time-series string of a web page can be output as related information.

In this case, a search text string of point-in-time t through $t_0−1$ or a time-series string of a web page is provided to obtain the search text string of the next point-in-time t+1 through $t_0$ or a predicting value of a time-series string of a web page, of which the top N with smaller prediction error can be set as multiple related information candidates.

Also, for example, with an HMM, various states of the HMM are assigned to each search text string $key_t$ and each web page $page_t$ of historical data, and perform learning to maximize the likelihood that the historical data is measured, whereby state transition probability to transition from a state wherein a certain text string $key_t$ or web page $page_t$ is assigned to a state wherein another text string $key_{t+1}$ or web page $page_{t+1}$ is assigned can be obtained.

In this case, when the search text string $key_t$ of the point-in-time t or the web page $page_t$ is provided, the search text string $key_{t+1}$ or the web page $page_{t+1}$ assigned to the top N with higher state transition probability out of the states which can be transmitted from the state of the search text string $key_t$ or the web page $page_t$ thereof, can become multiple related information candidates.

With an action model generating unit 54 thus configured, action model learning is performed using historical data stored in the search history database 53, and an action model generating processing to store the action model after learning is performed.

Figure 9:
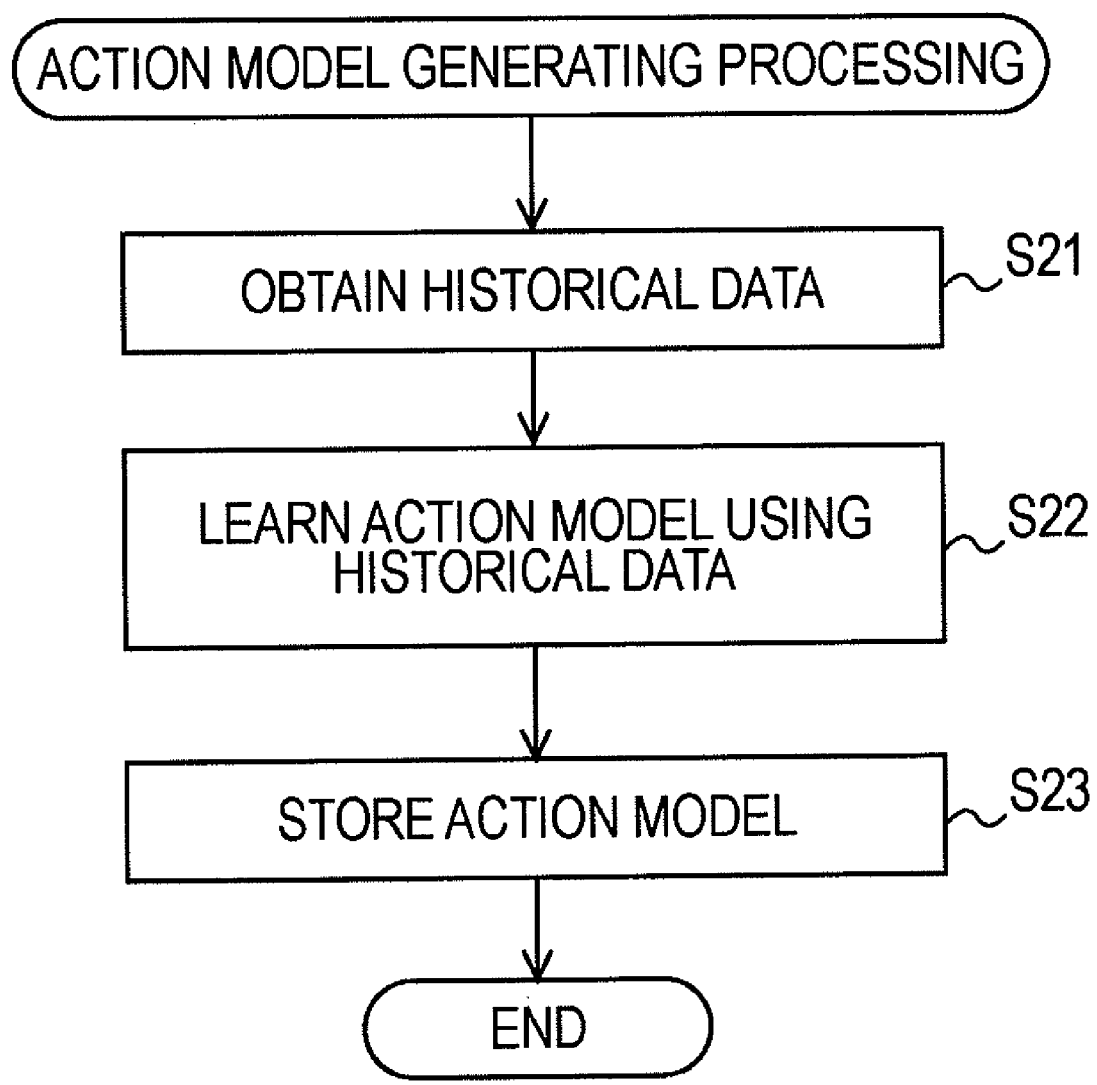
FIG. 9 is a flowchart describing action model generating processing.

The action model generating processing performed by the action model generating unit 54 in FIG. 8 will be described with reference to the flowchart in FIG. 9. Action model generating processing is performed when the historical data stored in the search history database is updated, for example.

With the action model generating processing, first in step S21, the search action model learning unit 81 obtains historical data serving as learning data for the search action model learning from the search history database 53.

Further, in step S21, the link action model learning unit 82 obtains historical data serving as learning data for the link action model learning from the search history database 53, and the keyword action model learning unit 83 obtains historical data serving as learning data for the keyword action model learning from the search history database 53.

The flow is then advanced from step S21 to step S22, where the search action model learning unit 81 performs search action model learning using the historical data obtained in step S21, the link action model learning unit 82 performs link action model learning using the historical data obtained in step S21, and the keyword action model learning unit 83 performs keyword action model learning using the historical data obtained in step S21, after which the flow is advanced to step S23.

In step S23, the search action model learning unit 81 stores the search action model after the learning in step S22 in the search action model storing unit 84. Further, in step S23, the link action model learning unit 82 stores the link action model after the learning in step S22 in the link action model storing unit 85, and the keyword action model learning unit 83 stores the keyword action model after the learning in step S22 in the keyword action model storing unit 86, and the action model generating processing is ended.

Thus, the search action model stored in the search action model storing unit 84, the link action model stored in the link action model storing unit 85, and the keyword action model stored in the keyword action model storing unit 86 are used for the connection searching processing with the connection searching unit 55.

Note that with the search action, a web page $page_{t+1}$ is obtained as related information, with the search text string $key_t$ as input information. Also, with the link action, a web page $page_{t+1}$ is obtained as related information, with the web page $page_t$ as input information. Further, with the keyword action, the search text string $key_{t+1}$ is obtained as related information, with the web page $page_t$ as input information.

In the case that action is consecutively performed, an action performed after a certain action is performed with the related information obtained with a certain action as input information, whereby the action performed after a search action becomes a link action or a keyword action. Also, an action performed after a link action becomes a link action or a keyword action, and an action performed after a keyword action becomes only a search action.

Of the above-described three search action model, link action model, and keyword action model, actions that are performed three or more times consecutively can be expressed as only search action model and keyword action model, or as only the link action model.

Accordingly, the action model generating unit 54 can be made up of, as shown in FIG. 8, the search action model learning unit 81 through keyword action model storing unit 86, but can also be made up of the search action model learning unit 81, keyword action model learning unit 83, search action model storing unit 84, and keyword action model storing unit 86, or can be made up of the link action model learning unit 82 and link action model storing unit 85.

However, in the case that the action model generating unit 54 is made up of the search action model learning unit 81, keyword action model learning unit 83, search action model storing unit 84, and keyword action model storing unit 86, the action model becomes only a search action model and keyword action model, and accordingly, an action that can be expressed with an action model, out of the actions performed three or more times consecutively, can only be actions that are performed alternately between a search action and a keyword action.

Also, in the case that the action model generating unit 54 is made up of the link action model learning unit 82 and link action model storing unit 85, the action model becomes only the link action model, and accordingly, an action that can be expressed with an action model, out of the actions performed three or more times consecutively, can only be actions wherein link actions are repeatedly performed.

Note that action model learning can be performed by each of a search action, link action, and keyword action as described above, but also can be performed without distinguishing between such search action, link action, and keyword action. That is to say, for example, as described above, in the case of employing a neural network such as RNN as the action model, one string of historical data is assigned to one RNN, whereby learning can be performed.

Figure 10:
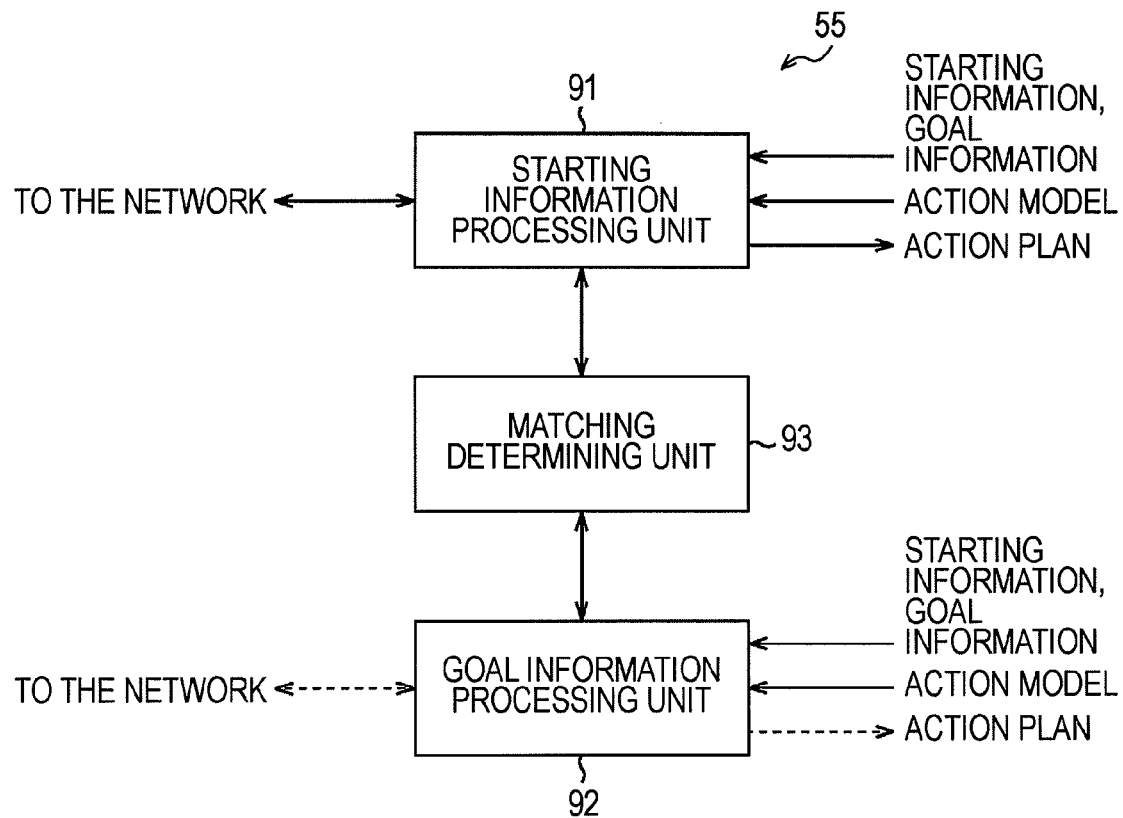
FIG. 10 is a block diagram illustrating a configuration example of a connection search unit.

Next, FIG. 10 shows a configuration example of the connection search unit 55 in FIG. 4. The connection search unit 55 is made up of a starting information processing unit 91, goal information processing unit 92, and matching determining unit 93.

The starting information and goal information from the obtaining unit 51 (FIG. 4) are supplied to the starting information processing unit 91, and an action model (search action model, link action model, and keyword action model) is supplied from the action model generating unit 54.

The starting information processing unit 91 finds new connection information that connects to the connection information with the starting information from the obtaining unit 51 to serve as an initial value of the connection information, whereby the starting information processing making up a starting series which is a connection information series including starting information is performed using the external information searching device 12 or information database 13 as suitable.

Also, determination results, as to whether or not the connection information of the starting series configured in the starting information processing is matching information that matches one of the connection information making up the later-described goal series which is obtained with the goal information processing unit 92, is supplied from the matching determining unit 93 to the starting information processing unit 91.

The starting information processing unit 91 configures the starting series by finding new connection information that connects to the connection search target in the starting information processing, wherein the connection information which is matching information becomes a connection search target that finds new connection information.

The starting information processing unit 91 outputs the starting series of when the connecting information having become matching information is the goal information as an action plan which is a connection information series including starting information and goal information.

That is to say, upon the connection information having become matching information becoming the goal information, i.e. upon a starting series including goal information as connection information being obtained, the starting information processing unit 91 outputs the starting series thereof as an action plan which is a connection information series including starting information and goal information.

The starting information and goal information from the obtaining unit 51 (FIG. 4) are supplied to the goal information processing unit 92, and an action model is supplied from the action model generating unit 54 thereto.

The goal information processing unit 92 finds new connection information that connects to the connection information with the goal information from the obtaining unit 51 to serve as an initial value of the connection information, whereby the goal information processing making up a goal series which is a connection information series including goal information is performed using the external information searching device 12 or information database 13 as suitable.

Also, determination results, as to whether or not the connection information of the goal series configured in the goal information processing is matching information that matches one of the connection information making up the starting series which is obtained with the starting information processing unit 91, is supplied from the matching determining unit 93 to the goal information processing unit 92.

The goal information processing unit 92 configures the goal series by finding new connection information that connects to the connection search target in the goal information processing, wherein the connection information which is matching information becomes a connection search target that finds new connection information.

The goal information processing unit 92 outputs the goal series of when the connecting information having become matching information is the starting information as an action plan which is a connection information series including starting information and goal information.

That is to say, upon the connection information having become matching information becoming the starting information, i.e. upon a starting series including starting information as connection information being obtained, the goal information processing unit 92 outputs the goal series thereof as an action plan which is a connection information series including starting information and goal information.

The starting series made up of starting information processing is supplied from the starting information processing unit 91, while the goal information made up of goal information processing is supplied from the goal information processing unit 92, to the matching determining unit 93.

The matching determining unit 93 evaluates the starting series from the starting information processing unit 91 and goal series from the goal information processing unit 92. Specifically, the matching determining unit 93 performs matching determining processing to determine whether or not new connection information from one of the starting series from the starting information processing unit 91 and goal series from the goal information processing unit 92 is matching information that matches one of the connection information making up the other series of the starting series and goal series, and supplies the determination results thereof to the starting information processing unit 91 and goal information processing unit 92.

That is to say, the matching determining unit 93 determines whether or not the new connection information of the starting series from the starting information processing unit 91 matches one of the connection information making up the goal series from the goal information processing unit 92, and supplies the determination results thereof to the starting information processing unit 91.

Also, the matching determining unit 93 determines whether or not the new connection information of the goal series from the goal information processing unit 92 matches one of the connection information making up the starting series from the starting information processing unit 91, and supplies the determination results thereof to the goal information processing unit 92.

Figure 11:
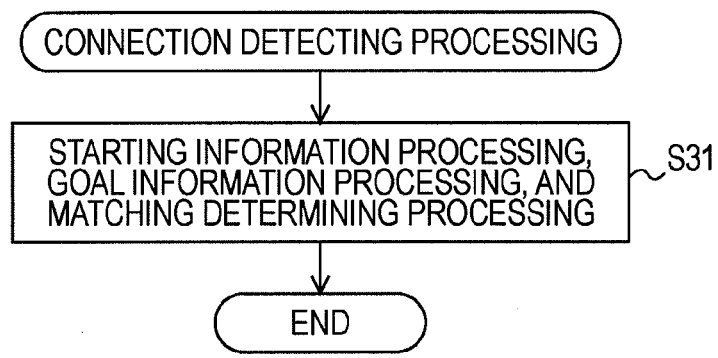
FIG. 11 is a flowchart describing connection searching processing.

Next, the connection searching processing (step S12 in FIG. 5) performed with the connection searching unit 55 in FIG. 10 will be described with reference to the flowchart in FIG. 11.

Starting information and goal information are supplied from the obtaining unit 51 to the starting information processing unit 91 and goal information processing unit 92, and an action model is supplied from the action model generating unit 54.

In step S31, the starting information processing unit 91 performs starting information processing and the goal information processing unit 92 performs goal information processing, while the matching determining unit 93 performs matching determining processing.

For example, if the connection information, determined to be matching information by the matching determining processing from the starting series connection information configured with the starting information processing, is goal information, or if the connection information, determined to be matching information by the matching determining processing from the goal series connection information configured with the goal information processing, is starting information, i.e. if an action which is a starting series including goal information as connection information is obtained with the starting information processing unit 91, or if an action which is a goal series including starting information as connection information is obtained with the goal information processing unit 92 (or if an action which is a starting series including goal information as connection information is obtained with the starting information processing unit 91, and an action which is a goal series including starting information as connection information is obtained with the goal information processing unit 92), The starting information processing with the starting information processing unit 91, the goal information processing with the goal information processing unit 92, and the matching determining processing with the matching determining unit 93 are ended.

Note that in the event that an action plan which is a starting series including goal information as connection information can be obtained with the starting information processing, the starting information processing unit 91 supplies (outputs) the action plan to the search result output unit 52 (FIG. 4). Also, in the event that an action plan which is a goal series including starting information as connection information can be obtained with the goal information processing, the goal information processing unit 92 supplies the action plan to the search result output unit 52.

With the search result output unit 52, one or both of the action plans from the starting information processing unit 91 and goal information processing unit 92 is/are selected as suitable and displayed.

Figure 12:
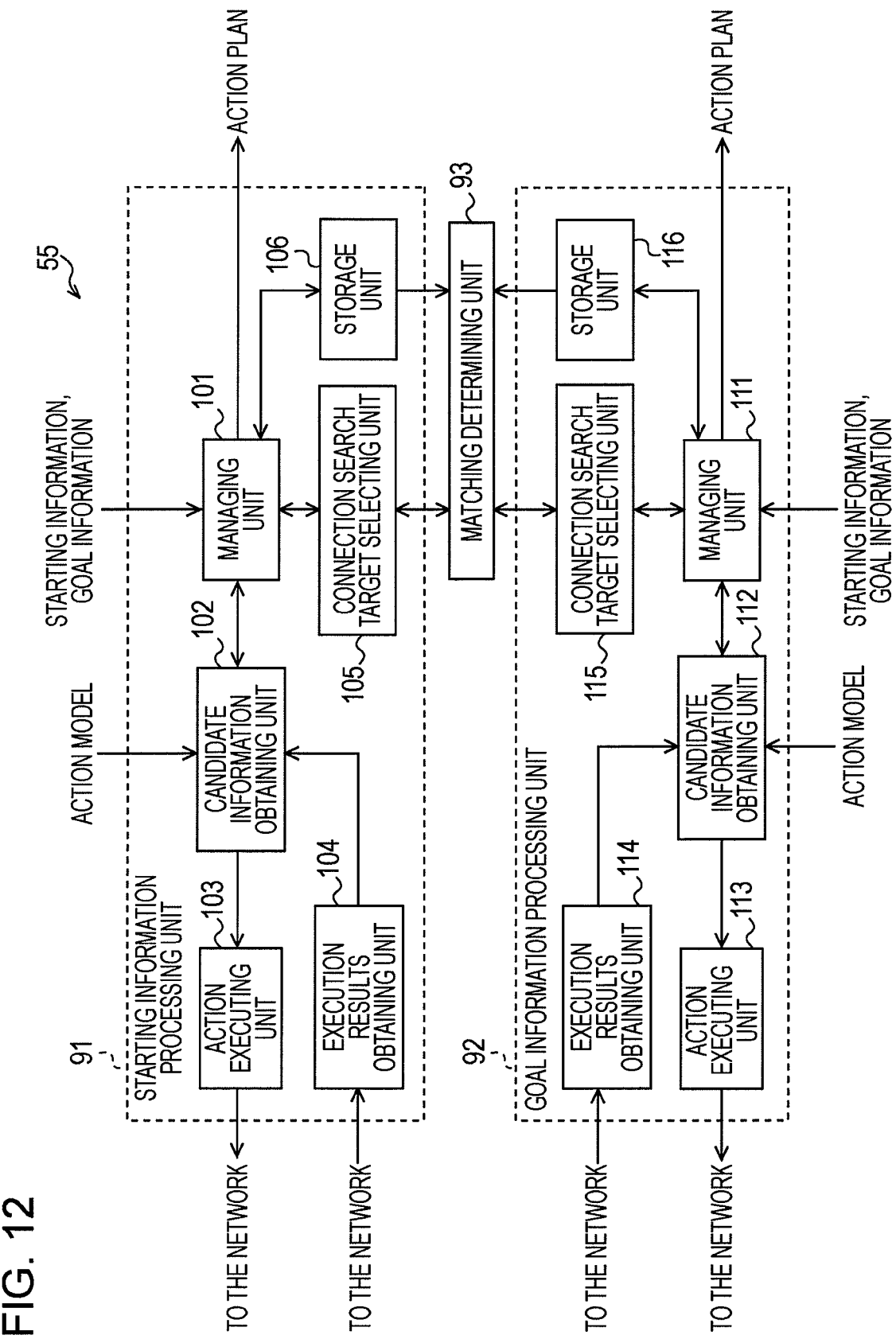
FIG. 12 is a block diagram illustrating a first configuration example of a starting information processing unit 91 and goal information processing unit.

Next, FIG. 12 shows a first configuration example of the starting information processing unit 91 and goal information processing unit 92 of the connection searching unit 55 in FIG. 10.

With the connection searching unit 55 in FIG. 12, the starting information processing unit 91 finding the related information obtained from the action model, when the connection information becomes input information as new connection information to serve as the starting information processing, is performed with the starting information as an initial value of the connection information, and the goal information processing unit 92 finding the related information obtained from the action model, when the connection information becomes input information as new connection information to serve as the goal information processing, is performed with the goal information as an initial value of the connection information.

Also, the starting information processing unit 91 and goal information processing unit 92 find new connection information that connects to a connection search target, with connection information having become matching information serving as the connection search target to find new connection information.

Accordingly, in FIG. 12, with the forward action method described in FIG. 3 the starting series is configured in the starting information processing unit 91, and with the forward action method, the goal series is configured in the goal information processing unit 92 also.

That is to say, the starting processing unit 91 is made up of a managing unit 101, candidate information obtaining unit 102, action executing unit 103, execution results obtaining unit 104, connection search target selecting unit 105, and storage unit 106.

The starting information and goal information from the obtaining unit 51 (FIG. 4) is supplied to the managing unit 101. The managing unit 101 manages the starting information processing that makes up the starting series, and as suitable controls the candidate information obtaining unit 102, connection search target selecting unit 105, and storage unit 106, based on the starting information and goal information from the obtaining unit 51.

Upon the starting series which includes goal information serving as connection information being configured, the managing unit 101 outputs an action plan which is the starting series to the search result output unit 52. An action model is supplied from the action model generating unit 54 (FIG. 4) to the candidate information obtaining unit 102.

In accordance with control by the managing unit 101, the candidate information obtaining unit 102 uses the action model from the action model generating unit 54 to find a candidate for new connection information that is connected to the connection search target, and supplies this to the managing unit 101 (candidate information).

That is to say, the managing unit 101 supplies the connection search target that is connection information of a target to obtain information (new connection information) to connect to the connection information from the connection information in the starting series (action plan), to the candidate information obtaining unit 102, and requests the candidate information obtaining unit 102 to obtain the candidate information of the new connection information that connects to the connection search target thereof.

In response to the request from the managing unit 101, the candidate information obtaining unit 102 uses the action model from the action model generating unit 54 to find candidate information from the new connection information that connects to the connection search target from the managing unit 101, and supplies this to the managing unit 101.

Also, in the case that the new connection information to serve as candidate information cannot be found using the action model, the candidate information obtaining unit 102 controls the action executing unit 103 to find candidate information (new connection information to serve as candidate information), using the external information searching device 12 (search engine) (FIG. 4) or an external information database 13 (WWW).

That is to say, the candidate information obtaining unit 102 uses an action model to find candidate information connecting to the connection search target with a forward action method.

In this case, if the action model is a large number of RNNs for example, the candidate information obtaining unit 102 assigns input information to each RNN, such input information being the connection search target, and the prediction values of the related information which each of the large number of RNNs output as to the input information, the top N with smaller prediction error can be found as candidate information.

That is to say, in the case that learning of an RNN as an action model is performed with the search text string of point-in-time t0 (t>t0) or time series string of web pages serving as input information, and the search text string of the next point-in-time t+1 through t0+1 or prediction value of the time series string of web pages serving as related information, a search text string of point-in-time t through t0−1 or time series string of web pages is assigned to each of the large number of RNNs, and a prediction value of point-in-time t+1 through t0 or time series string of web pages is requested of each of the large number of RNNs, whereby the prediction value of the related information that each of the top N RNNs having the smaller prediction error of the prediction values thereof is output, and is found as candidate information.

Note that also, with a large number of RNNs as action models, for example, learning is performed to predict the input of the input information as well as related information, and with the candidate information obtaining unit 102 the input information wherein the connection search target serves as input information is assigned to each RNN, whereby of the prediction values of the input information that each of the large number of RNNs output as to the input information thereof, the prediction values of the candidate information that each of the top N RNNs having the smaller prediction errors output can be set as candidate information.

However, in the case that the minimum prediction error is greater than the predetermined threshold prediction error, the prediction value of related information corresponding to input information which is output from the RNN has low reliability, whereby the candidate information obtaining unit 102 determines that (new connection information which becomes) candidate information cannot be found using an action model, and thus uses the external information searching device 12 and information database 13 to find candidate information.

Also, in the case that an action model is an HMM for example, the candidate information obtaining unit 102 finds as candidate information, the related information assigned to the top N states with higher state transition probability out of the states which can be transmitted from the states assigned to input information, the connection search targeting being such input information.

However, in the case that the maximum state transition probability is smaller than the predetermined state transition probability, the related information corresponding to the input information which is obtained from the HMM has low reliability, whereby the candidate information obtaining unit 102 determines that candidate information cannot be found using the action model, and uses the external information searching device 12 or information database 13 to find candidate information.

In the case of using the external information searching device 12 or information database 13 to find candidate information, the candidate information obtaining unit 102 supplies the connection search target as to the action executing unit 103 and requests an action to obtain the candidate information connecting to the connection search target thereof.

In this case, the action executing unit 103 access the information searching device 12 or information database 13 via the network 1 (FIG. 1), and executes an action to obtain candidate information that connects to the connection search target. The candidate information obtained as a result of the action being executed is obtained (received) at the execution result obtaining unit 104 and supplied to the candidate information obtaining unit 102.

The candidate information obtaining unit 102 thus supplies the candidate found using an action model or the candidate information supplied from the execution result obtaining unit 104 to the managing unit 101.

The action executing unit 103 similarly executes an action with the connection search target from the candidate information obtaining unit 102 as the input information, according to an action request from the candidate information obtaining unit 102.

The executing result obtaining unit 104 receives the results of action execution by the action executing unit 103, and obtains the candidate information from the results of the action execution and supplies this to the candidate information obtaining unit 102.

In the case that the connection search target from the candidate information obtaining unit 102 is a search text string, the action executing unit 103 performs a search action, and in the case that the connection search target from the candidate information obtaining unit 102 is a web page, the action executing unit 103 performs one or both of a link action and keyword action.

In the case of performing a search action, the action executing unit 103 requests the information searching device 12 (FIG. 1) to search for a web page including the search text string which is the connection search target from the candidate information obtaining unit 102, and the execution result obtaining unit 104 receives a list of web pages including the search text string, which is transmitted from the information searching device 12 according to the search request thereof.

The execution result obtaining unit 104 obtains the top N web pages described earlier, for example, in the menu of web pages including search text string from the information searching device 12, as candidate information, and supplies this to the candidate information obtaining unit 102.

Also, in the case of performing a link action, the action executing unit 103 requests the information database 13 (FIG. 1) for a web page which is the connection search target from the candidate information obtaining unit 102, and the executing result obtaining unit 104 receives the web page transmitted from the information database 13 according to the request thereof.

The execution result obtaining unit 104 selects N links randomly, for example, from the links posted on the web page from the information database 13, and supplies the web page information (e.g., URL or the above ID or the like) at the link destination thereof as candidate information to the candidate information obtaining unit 102.

Further in the case of performing a keyword action, the action executing unit 103 requests the information database 13 (FIG. 1) for a web page which is the connection search target from the candidate information obtaining unit 102, and the executing result obtaining unit 104 receives the web page transmitted from the information database 13 according to the request thereof.

The execution result obtaining unit 104 randomly selects N words such as predetermined parts of speech, such as proper nouns and so forth from within the web page from the information database 13, and supplies the N words thereof as candidate information to the candidate information obtaining unit 102.

The connection search target selecting unit 105 selects (new connection information serving as) a connection search target from the new connection information selected from the candidate information according to control from the managing unit 101, and supplies this to the managing unit 101.

That is to say, upon the candidate information being supplied from the candidate information obtaining unit 102, the managing unit 101 selects connection information that connects to the connection search target (to become candidate information), and stores the new connection information in the storage unit 106 to include in the starting series in a form that connects to the connection search target.

Specifically, for example, if a certain one connection search target that is currently in the starting series is focused on as a target of interest, and N pieces of candidate information as to the target of interest are supplied from the candidate information obtaining unit 102 to the managing unit 101, the managing unit 101 selects 0 or more pieces of candidate information to serve as new connection information that connects to the target of interest from the N pieces of candidate information, as suitable.

In order to prevent the connection search targets in the starting series to become an enormous number, the managing unit 101 selects new connection information to connect to the target of interest from the N pieces of candidate information, whereby the number of new pieces of connection information that can be connection search targets can be limited.

In the case that the connection search targets in the starting series have not reached a certain number, the managing unit 101 can select all of the N pieces of candidate information as new connection information that connects to the connection search targets, for each connection search target, for example.

Also, in the case that there are a certain number of connection search targets or more in the starting series, for example for each connection search target, of N pieces of candidate information, at least one but less than N pieces of candidate information can be selected as new connection information that connects to the connection search target, or for a portion of connection search targets, all of the N pieces of candidate information are selected as new connection information that connects to the target of interest, and as to the remaining connection search targets, 0 pieces of candidate information of the N pieces of the candidate information are selected as new connection information that connects to the connection search target, i.e. not all of the N pieces of candidate information are unexceptionally selected as new connection information that connects to the target of interest.

Upon selecting new connection information from the candidate information, the managing unit 101 includes the new connection information in the starting series stored in the storage unit 106 is a form that connects to the connection search target.

The managing unit 101 supplies the new connection information to the connection search selecting unit 105, and requests the connection search target selecting unit 105 to select a (new) connection search target from the new connection information thereof.

In response to the request from the managing unit 101, the connection search target selecting unit 105 selects a connection search target from the new connection information from the managing unit 101, and supplies this to the managing unit 101.

That is to say, if there is a request for selection of a connection search target from the managing unit 101, the connection search target selecting unit 105 requests the matching determining unit 93 to determine whether or not the new connection information (new connection information in the starting series) from the managing unit 101 is matching information which matches one of the connection information making up the goal series (hereafter also called matching determining).

Upon receiving a request for matching determining from the connection search target selecting unit 105, the matching determining unit 93 performs matching determining as to whether the new connection information of the starting series matches one of the connection information making up the goal series stored in the later-described storage unit 116 of the goal information processing unit 92, and supplies the determination result of the matching determining thereof to the connection search target selecting unit 105.

In the case that determination results expressing that the new connection information in the starting series is matching information is supplied from the matching determining unit 93, the connection search target selecting unit 105 selects only the new connection information which is matching information as a connection search target, and supplies this to the managing unit 101.

Also, in the case that determination results expressing that the new connection information in the starting series is not matching information is supplied from the matching determining unit 93, the connection search target selecting unit 105 selects all of the new connection information which is matching information as a connection search target, and supplies this to the managing unit 101.

The managing unit 101 thus supplies the connection search target supplied from the connection search target selecting unit 105 to the candidate information obtaining unit 102, and as described above, requests the candidate information obtaining unit 102 to obtain candidate information of the new connection information that connects to the connection search target.

The storage unit 106 stores the starting series in accordance with control by the managing unit 101. That is to say, upon new connection information being selected from the candidate information from the candidate information obtaining unit 102 as described above, the managing unit 101 reads the starting series stored in the storage unit 106, and includes the new connection information in the starting series thereof in a form to connect to the connection search target, whereby a new starting series is configured and supplied to the storage unit 106. The storage unit 106 thus stores a new starting series supplied from the managing unit 101.

The goal information processing unit 92 is made up of a managing unit 111, candidate information obtaining unit 112, action executing unit 113, execution result obtaining unit 114, connection search target selecting unit 115, and storage unit 116.

The managing unit 111 through storage unit 116 each perform processing with the "starting" and "goal" in the above-description of the managing unit 101 through storage unit 106 making up the starting information processing unit 91 reread as "goal" and "starting", respectively. That is to say, the starting information and goal information from the obtaining unit 51 (FIG. 4) is supplied to the managing unit 111.

The managing unit 111 manages the goal information processing making up the goal series, and controls the candidate information obtaining unit 112, connection search target selecting unit 115, and storage unit 116, based on starting information and goal information from the obtaining unit 51 as suitable. Upon the goal series including starting information as connection information being configured, the managing unit 111 outputs the action plan which is the goal series thereof to the search result output unit 52.

An action model is supplied to the candidate information obtaining unit 112 from the action model generating unit 54 (FIG. 4). The candidate information obtaining unit 112 uses the action model from the action model generating unit 54 to find a candidate (candidate information) for new connection information that connects to the connection search target in accordance with control from the managing unit 111, and supplies this to the managing unit 111.

That is to say, the managing unit 111 supplies the connection search target which is connection information of a target that obtains information that connects to the connection information out of the connection information of the goal series (action plan), to the candidate information obtaining unit 112, and requests the candidate information obtaining unit 112 to obtain candidate information for new connection information that connects to the connection search target thereof.

In response to the request from the managing unit 111, the candidate information obtaining unit 112 uses the action model from the action model generating unit 54 to find the candidate information of the new connection information that connects to the connection search target from the managing unit 111, and supplies this to the managing unit 111.

Also, in the case that new connection information to serve as candidate information cannot be found using the action model, the candidate information obtaining unit 112 controls the action executing unit 113, similar to the candidate information obtaining unit 102, whereby candidate information (new connection information to serve as candidate information) is obtained from the execution result obtaining unit 114.

The action executing unit 113 executes action according to an action request from the candidate information obtaining unit 112, similar to the action executing unit 103.

The executing result obtaining unit 114 receives the execution results of action by the action executing unit 113 via the network 1, similar to the execution result obtaining unit 104, obtains the candidate information from the action execution results, and supplies this to the candidate information obtaining unit 112.

The connection search target selecting unit 115 selects (new connection information to serve as) a connection search target from new connection information selected from the candidate information, in accordance with control by the managing unit 111, and supplies this to the managing unit 111. That is to say, upon candidate information being supplied from the candidate information obtaining unit 112, the managing unit 111 selects (candidate information to be) new connection information that connects to the connection search target from the candidate information, similar to the managing unit 101, and includes the new connection information in the goal series in a form that connects to the connection search target and stores this in the storage unit 116.

Further, the managing unit 111 supplies the new connection information selected from the candidate information to the connection search target selecting unit 115, and requests the connection search target selecting unit 115 to select a connection search target from the new connection information. In response to the request from the managing unit 111, the connection search target selecting unit 115 selects a connection search target from the new connection from the managing unit 111, and supplies this to the managing unit 111.

That is to say, if there is a request for selection of a connection search target from the managing unit 111, the connection search target selecting unit 115 requests the matching determining unit 93 to determine whether or not the new connection information (new connection information in the goal series) from the managing unit 111 is matching information which matches one of the connection information making up the starting series (matching determining).

If there is a request for matching determining from the connection search target selecting unit 115, the matching determining unit 93 performs matching determining as to whether or not the new connection information of the goal series is matching information that matches one of the connection information making up the starting series stored in the storage unit 106 of the starting information processing unit 91, and supplies the determination results of the matching determining thereof to the connection search target selecting unit 115.

In the case that determination results expressing that the new connection information of the goal series is matching information is supplied from the matching determining unit 93, the connection search target selecting unit 115 selects only the new connection information that is matching information to be a connection search target, and supplies this to the managing unit 111.

Also, in the case that determination results expressing that the new connection information of the goal series is not matching information is supplied from the matching determining unit 93, the connection search target selecting unit 115 selects all of the new connection information as connection search targets, and supplies this to the managing unit 111.

The storage unit 116 stores this in the goal series in accordance with control by the managing unit 111. That is to say, upon new connection information being selected from the candidate information from the candidate information obtaining unit 112 as described above, the managing unit 111 reads the goal series stored in the storage unit 116, and includes the new connection information in the goal series thereof in a form to connect to the connection search target, whereby a new goal series is configured and supplied to the storage unit 116. The storage unit 116 thus stores a new goal series supplied from the managing unit 111.

Next, the starting information processing performed by the starting information processing unit 91 in FIG. 12 is described with reference to the flowchart in FIG. 13.

Upon the starting information and goal information from the obtaining unit 51 (FIG. 4) supplied to the managing unit 101 of the starting information processing unit 91, the starting information processing is started.

With the starting information processing, in step S41 the managing unit 101 sets the starting information from the obtaining unit 51 as the initial value of the connection information of the starting series, i.e. configures a starting series which includes only starting information as connection information, supplies and stores this in the storage unit 106, and the flow is advanced to step S42.

In step S42, the managing unit 101 selects the starting information as the connection search target, and supplies this to the candidate information obtaining unit 102, while requesting the candidate information obtaining unit 102 to obtain candidate information of the new connection information that connects to the connection search target thereof, and the flow is advanced to step S43.

In step S43, in response to the request from the managing unit 101, the candidate information obtaining unit 102 uses the action model stored in the action model generating unit 54, and for each connection search target from the managing unit 101 finds the candidate information of the new connection information that connects to the connection search target thereof with forward action, and the flow is advanced to step S44.

In step S44, the candidate information obtaining unit 102 determines whether or not there is any connection search target that has not been able to find candidate information (connection search target wherein candidate information with low reliability is found) with the forward action method using an action model, as described in FIG. 12.

In the case determination is made in step S44 that there is connection search target that has not been able to find candidate information with a forward action method using an action model, the flow is advanced to step S45, and the candidate information obtaining unit 102 controls the action executing unit 103 to use the external information searching device 12 (FIG. 1) or external information database 13, find candidate information for the connection search target that has not been able to find candidate information with the forward action method sing an action model, and obtaining the candidate information thereof from the execution result obtaining unit 104.

The candidate information obtaining unit 102 supplies the candidate information obtained for each of the connection search targets from the managing unit 101 to the managing unit 101, and the flow is advanced from step S45 to step S46.

Also, in the case determination is not made in step S44 that there is connection search target that has not been able to find candidate information with a forward action method using an action model, the candidate information obtaining unit 102 supplies the candidate information found with the forward action method using an action model to the managing unit 101, for each of the connection search targets from the managing unit 101, and the flow skips step S45 and is advanced to step S46.

In step S46, the managing unit 101 selects the new connection information that connects to the connection search targets, from the candidate information for each connection search target, which is from the candidate information obtaining unit 102, in order to limit the number of pieces of connection information as described in FIG. 12, and the flow is advanced to step S47.

In step S47, the managing unit 101 includes the new connection information selected for each connection search target in step S46 in a form to connect to the connection search target in the starting series, and stores the starting series thereof in the storage unit 106 in a form of overwriting.

Further, the managing unit 101 supplies new connection information selected for each of the connection search targets to the connection search target selecting unit 105, and requests the connection search target selecting unit 105 to select the connection search target from the new connection information, and the flow is advanced to step S48.

In step S48, the connection search target selecting unit 105 requests the matching determining unit 93 to perform matching determining as to whether or not the new connection information from the managing unit 101 (new connection information of the starting series) is matching information that matches one of the pieces of connection information making up the goal series, awaits the determination results from the matching determining to be supplied from the matching determining unit 93, and determines whether or not one or more pieces of new connection information in the starting series is matching information that matches one of the connection information making up the goal series stored in the storage unit 116 of the goal information processing unit 92.

In the case determination is made in step S48 that all of the new connection information of the starting series is not matching information, the flow is advanced to step S49, and the connection search target selecting unit 105 selects all of the new connection information of the starting series as the connection search target, and supplies this to the managing unit 101.

The managing unit 101 supplies the connection search target from the connection search target selecting unit 105, i.e. in the current case all of the new connection information in the starting series, to the candidate information obtaining unit 102, and then requests the candidate information obtaining unit 102 to obtain the candidate information of new connection information that connects to the connection search target thereof, and the flow returns to step S43 and similar processing thereafter is repeated.

Also, in the case determination is made in step S48 that one or more pieces of new connection information of the starting series is matching information, the flow is advanced to step S50, and the connection search target selecting unit 105 selects the new connection information which is matching information out of the new connection information of the starting series as a connection search target, supplies this to the managing unit 101, and the flow is advanced to step S51.

In step S51, the managing unit 101 determines whether or not one of the connection search target from the connection search target selecting unit 105, i.e. in the current case one of the new connection information which is matching information out of the new connection information of the starting series, matches the goal information from the obtaining unit 51 (FIG. 4).

In the case determination is made in step S51 that none of the new connection information (here, connection search target) which is matching information in the starting series matches the goal information, the managing unit 101 supplies the connection search target from the connection search target selecting unit 105, i.e. in the current case the new connection information which is matching information in the starting series to the candidate information obtaining unit 102, while requesting the candidate information obtaining unit 102 to obtain the candidate information of the new connection information that connects to the connection search target, the flow is returned to step S43, and thereafter similar processing is repeated.

In the case determination is made in step S51 that one of the new connection information which is matching information in the starting series matches the goal information, i.e. the starting series of which the configuration is started with the starting information as the initial value of the connection information includes the goal information as connection information, and accordingly, in the case that an action plan showing the connections between the starting information and goal information is configured, the flow is advanced to step S52, and the managing unit 101 reads the action plan stored in the storage unit 106, i.e. the action plan showing the connections between the starting information and goal information, outputs this to the search result output unit 52, and ends the starting information processing.

Next, the goal information processing performed by the goal information processing unit 92 in FIG. 12 will be described with reference to the flowchart in FIG. 14.

Figure 13:
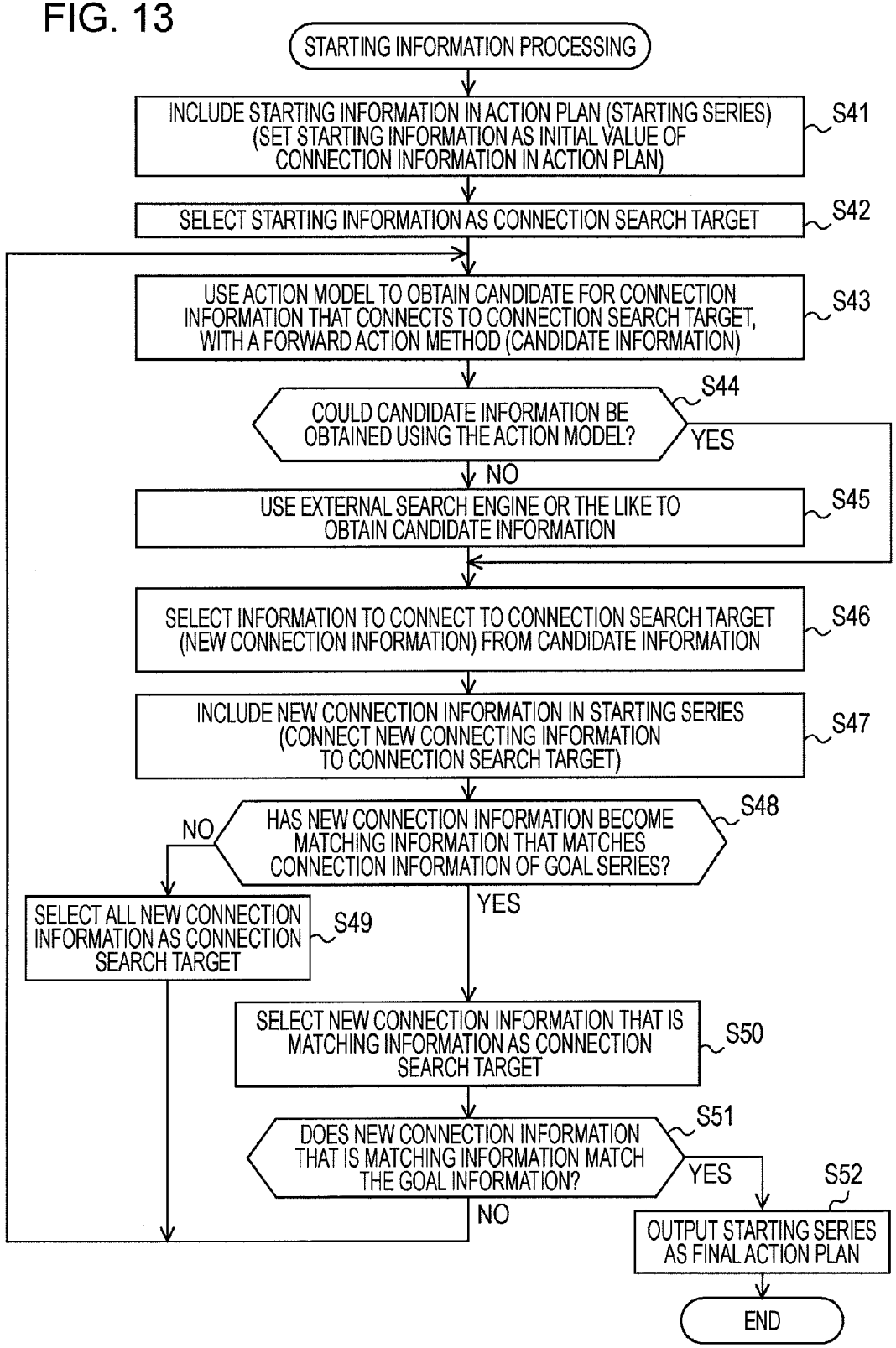
FIG. 13 is a flowchart describing starting information processing.

Upon the starting information and goal information from the obtaining unit 51 (FIG. 4) being supplied to the managing unit 111 in the goal information processing unit 92, the goal information processing is started, and similar processing is performed as the starting information processing in FIG. 13 other than the starting information replaced by goal information.

With the goal information processing, in step S61 the managing unit 111 sets the goal information from the obtaining unit 51 as the initial value of the connection information of the goal series, i.e. configures a goal series which includes only goal information as connection information, supplies and stores this in the storage unit 116, and the flow is advanced to step S62.

In step S62, the managing unit 111 selects the goal information as the connection search target, and supplies this to the candidate information obtaining unit 112, while requesting the candidate information obtaining unit 112 to obtain candidate information of the new connection information that connects to the connection search target thereof, and the flow is advanced to step S63.

In step S63, in response to the request from the managing unit 111, the candidate information obtaining unit 112 uses the action model stored in the action model generating unit 54, and for each connection search target from the managing unit 111 finds the candidate information of the new connection information that connects to the connection search target thereof with a forward action method, and the flow is advanced to step S64.

In step S64, the candidate information obtaining unit 112 determines whether or not there is any connection search target that has not been able to find candidate information (connection search target wherein candidate information with low reliability is found) with the forward action method using an action model, similar to the candidate information obtaining unit 102.

In the case determination is made in step S64 that there is connection search target that has not been able to find candidate information with a forward action method using an action model, the flow is advanced to step S65, and the candidate information obtaining unit 112 controls the action executing unit 113 to use the external information searching device 12 (FIG. 1) or external information database 13, find candidate information for the connection search target that has not been able to find candidate information with the forward action method sing an action model, and obtaining the candidate information thereof from the execution result obtaining unit 114.

The candidate information obtaining unit 112 supplies the candidate information obtained for each of the connection search targets from the managing unit 111 to the managing unit 111, and the flow is advanced from step S65 to step S66.

Also, in the case determination is not made in step S64 that there is connection search target that has not been able to find candidate information with a forward action method using an action model, the candidate information obtaining unit 112 supplies the candidate information found with the forward action method using an action model to the managing unit 111, for each of the connection search targets from the managing unit 111, and the flow skips step S65 and is advanced to step S66.

In step S66, similar to the managing unit 101, the managing unit 111 selects the new connection information that connects to the connection search targets, from the candidate information for each connection search target, which is from the candidate information obtaining unit 112 in order to limit the number of pieces of connection information, and the flow is advanced to step S67.

In step S67, the managing unit 111 includes the new connection information selected for each connection search target in step S66 in a form to connect to the connection search target in the goal series, and stores the goal series thereof in the storage unit 116 in a form of overwriting.

Further, the managing unit 111 supplies new connection information selected for each of the connection search targets to the connection search target selecting unit 115, and requests the connection search target selecting unit 115 to select the connection search target from the new connection information, and the flow is advanced to step S68.

In step S68, the connection search target selecting unit 115 requests the matching determining unit 93 to perform matching determining as to whether or not the new connection information from the managing unit 111 (new connection information of the goal series) is matching information that matches one of the pieces of connection information making up the starting series, awaits the determination results from the matching determining to be supplied from the matching determining unit 93, and determines whether or not one or more pieces of new connection information in the goal series is matching information that matches one of the connection information making up the starting series stored in the storage unit 106 of the starting information processing unit 91.

In the case determination is made in step S68 that all of the new connection information of the goal series is not matching information, the flow is advanced to step S69, and the connection search target selecting unit 115 selects all of the new connection information of the goal series as the connection search target, and supplies this to the managing unit 111.

The managing unit 111 supplies the connection search target from the connection search target selecting unit 115, i.e. in the current case all of the new connection information in the goal series, to the candidate information obtaining unit 112, and the requests the candidate information obtaining unit 112 to obtain the candidate information of new connection information that connects to the connection search target thereof, and the flow returns to step S63 and similar processing thereafter is repeated.

Also, in the case determination is made in step S68 that one or more pieces of new connection information of the goal series is matching information, the flow is advanced to step S70, and the connection search target selecting unit 115 selects the new connection information which is matching information out of the new connection information of the goal series as a connection search target, supplies this to the managing unit 111, and the flow is advanced to step S71.

In step S71, the managing unit 111 determines whether or not one of the connection search target from the connection search target selecting unit 115, i.e. in the current case one of the new connection information which is matching information out of the new connection information of the goal series, matches the starting information from the obtaining unit 51 (FIG. 4).

In the case determination is made in step S71 that none of the new connection information (here, connection search target) which is matching information in the goal series matches the starting information, the managing unit 111 supplies the connection search target from the connection search target selecting unit 115, i.e. in the current case the new connection information which is matching information in the goal series to the candidate information obtaining unit 112, while requesting the candidate information obtaining unit 112 to obtain the candidate information of the new connection information that connects to the connection search target, the flow is returned to step S63, and thereafter similar processing is repeated.

In the case determination is made in step S71 that one of the new connection information which is matching information in the goal series matches the starting information, i.e. the goal series of which the configuration is started with the goal information as the initial value of the connection information includes the starting information as connection information, and accordingly, in the case that an action plan showing the connections between the starting information and goal information is configured, the flow is advanced to step S72, and the managing unit 111 reads the action plan stored in the storage unit 116, i.e. the action plan showing the connections between the starting information and goal information, outputs this to the search result output unit 52, and ends the goal information processing.

With the connection searching unit 55 in FIG. 12, with either of the starting information processing unit 91 and goal information processing unit 92, new connection information can be found with a forward action method.

That is to say, when connection information which is a connection search target becomes input information, the related information obtained from the action model is found as new connection information.

In this case, whether one of the two pieces of search target information obtained with the obtaining unit 51 is starting information and the other is goal information, or whether one is the goal information and the other is starting information, a similar action plan can be obtained.

Figure 14:
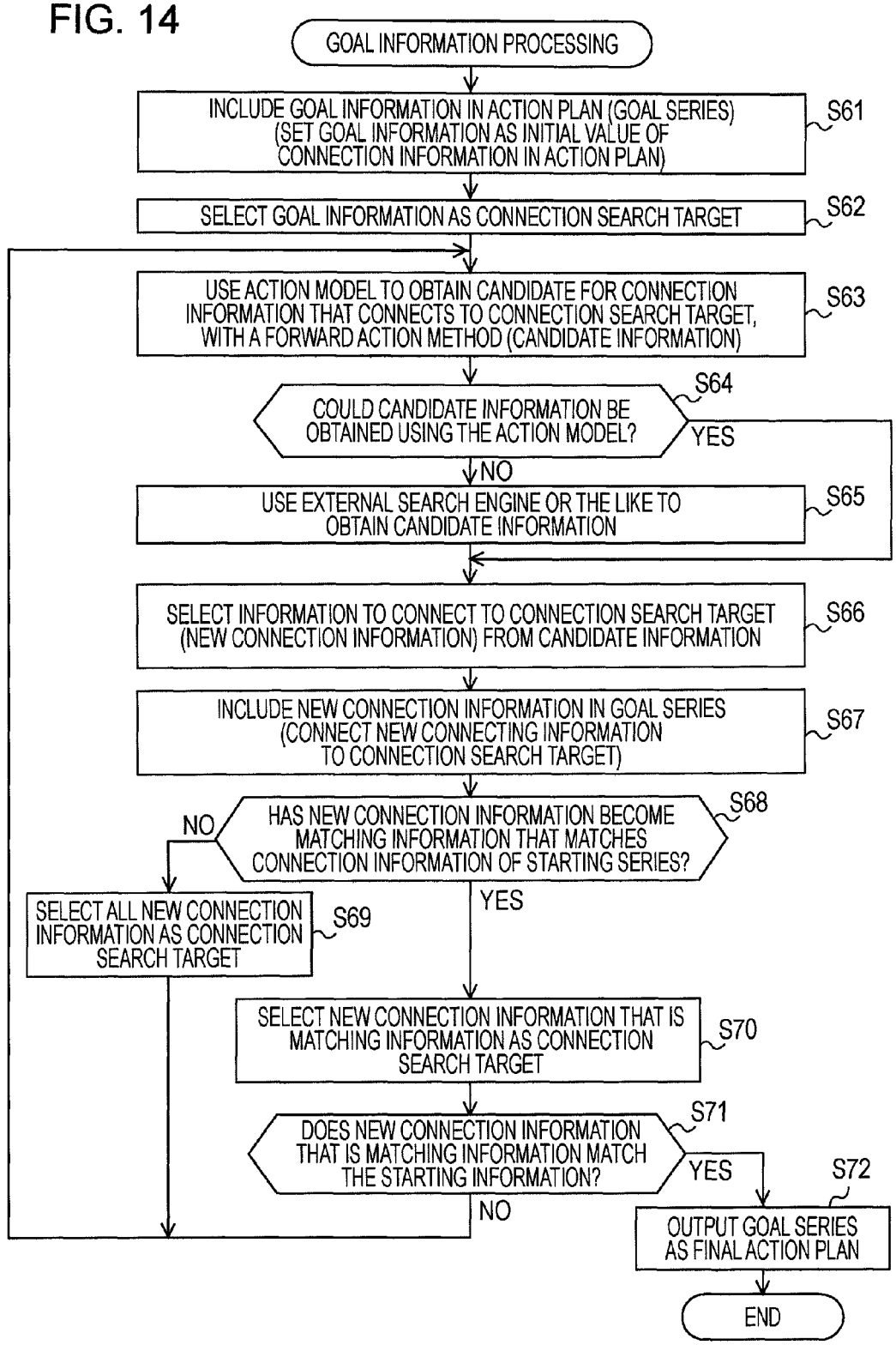
FIG. 14 is a flowchart describing goal information processing.

Note that with the starting information processing (as with the goal information processing), if we say that the time from the connection information being included in the starting series (goal series) until the next new connection information is included is one cycle processing, with the starting information processing in FIG. 13 and the goal information processing in FIG. 14, one cycle processing can be performed simultaneously, or one cycle processing can be performed alternately.

Also, an arrangement may be made wherein, with the starting information processing in FIG. 13, one cycle processing is performed multiple times and thereafter with the goal information processing in FIG. 14, one cycle processing is performed one time or repeated multiple times, or an arrangement may be made wherein, with the starting information processing in FIG. 13, one cycle processing is performed one time and thereafter with the goal information processing in FIG. 14, one cycle processing is repeatedly performed multiple times.

Further, an arrangement may be made wherein only one of the starting information processing in FIG. 13 or the goal information processing in FIG. 14 is performed.

In the case of performing only the starting information processing in FIG. 13, one cycle processing is repeatedly performed in the starting series until the goal information is included as connection information.

Also, in the case of performing only the goal information processing in FIG. 14, one cycle processing is repeatedly performed in the goal series until the starting information is included as connection information.

Both the starting information processing unit 91 and goal information processing unit 92 are not provided in the connection searching unit 55 in FIG. 12, but only one is provided, and the other can be caused to perform both starting information processing and goal information processing.

Next, an action plan (starting series and goal series) made up of the starting information processing performed with the starting information processing unit 91 and the goal information processing performed with the goal information processing unit 92 in the connection searching unit 55 in FIG. 12 will be described with reference to FIGS. 15 through 18.

Note that in FIGS. 15 through 18, the search text string (keyword) "Central Park" is the starting information and the search text string "Lower Manhattan" is the goal information.

Figure 15:
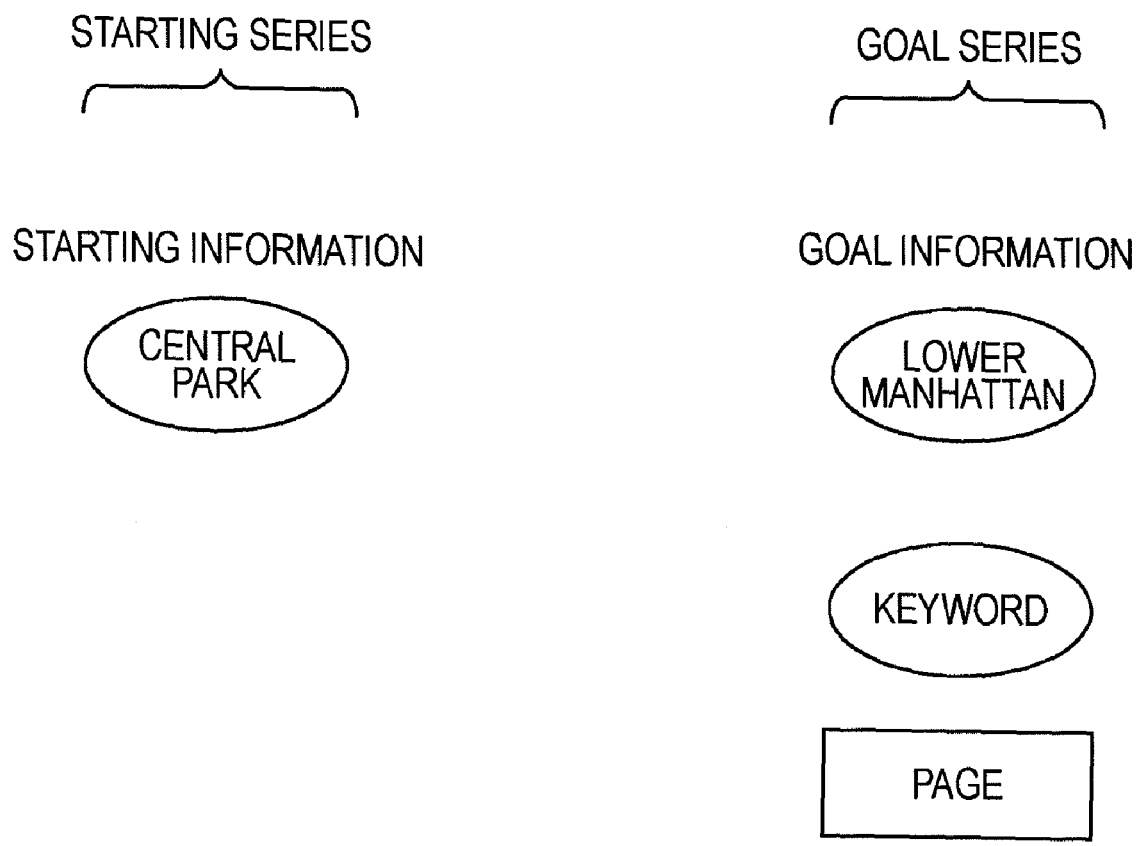
FIG. 15 is a diagram illustrating an example of starting series and goal series.

FIG. 15 shows a starting series immediately following the start of the starting information processing and a goal series immediately following the start of the goal information processing. In FIG. 15, the starting series is made up from only the connection information "Central Park" which is the starting information, and the goal series is made up from only the connection information "Lower Manhattan" which is the goal information.

Figure 16:
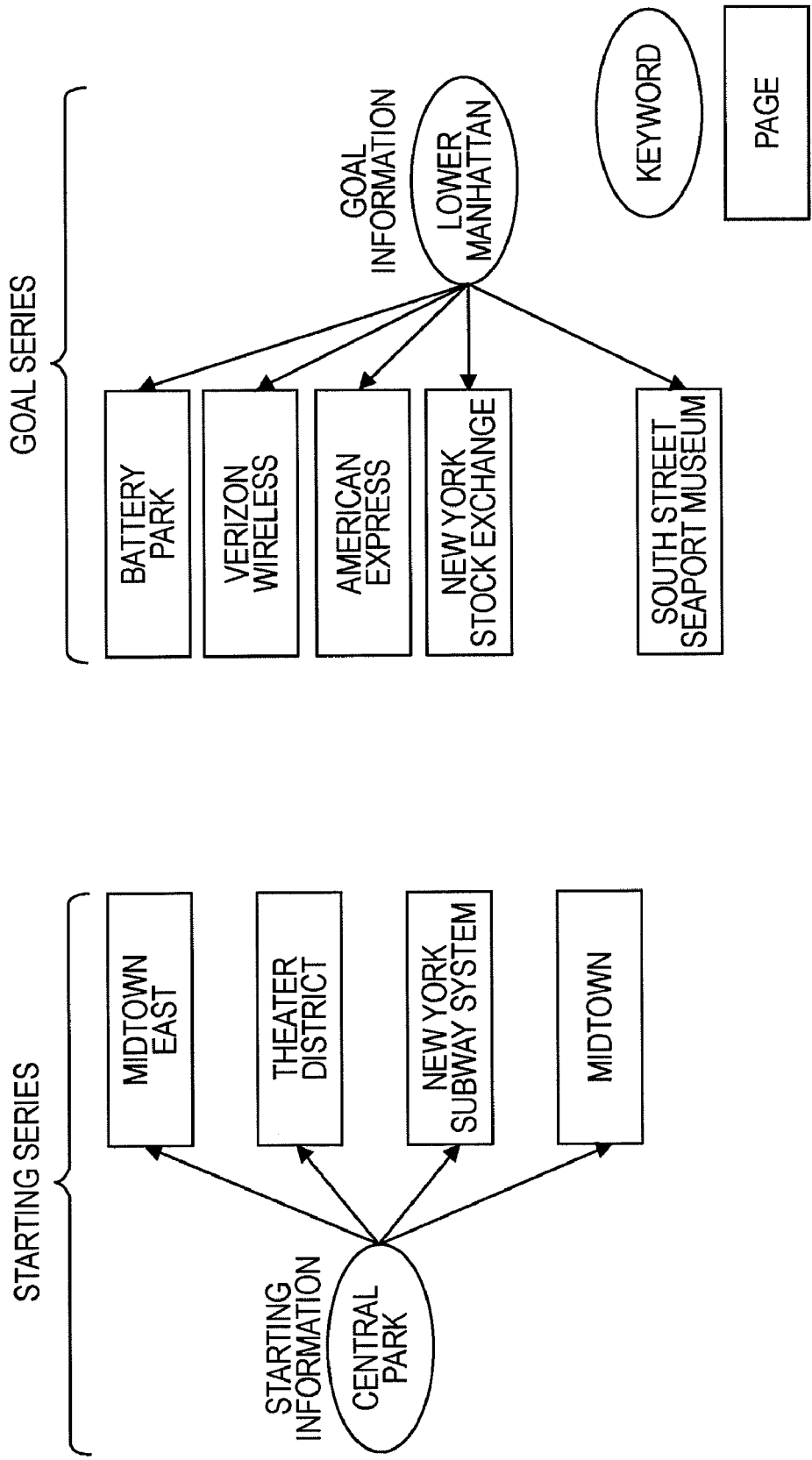
FIG. 16 is a diagram illustrating an example of starting series and goal series.

In FIG. 16, the connection information "Central Park", which is the starting information, serves as the connection search target whereby a starting series following new connection information being found with a forward action method is shown, and the connection information "Lower Manhattan", which is the goal information, serves as the connection search target whereby a goal series following new connection information being found with a forward action method is shown.

In FIG. 16, the starting series is made up of web pages relating to the connection information "Central Park", which is the starting information, and "Midtown East", "Theater District", "NY Subway System", and "Midtown" which are new connection information found with the forward action method using the connection information "Central Park" as the connection search target.

Also, in FIG. 16, the goal series is made up of web pages relating to the connection information "Lower Manhattan", which is the goal information, and "Battery Park", "Verizon Wireless", "American Express", "New York Stock Exchange", and "South Street Seaport Museum" which are new connection information found with the forward action method using the connection information "Lower Manhattan" as the connection search target.

Figure 17:
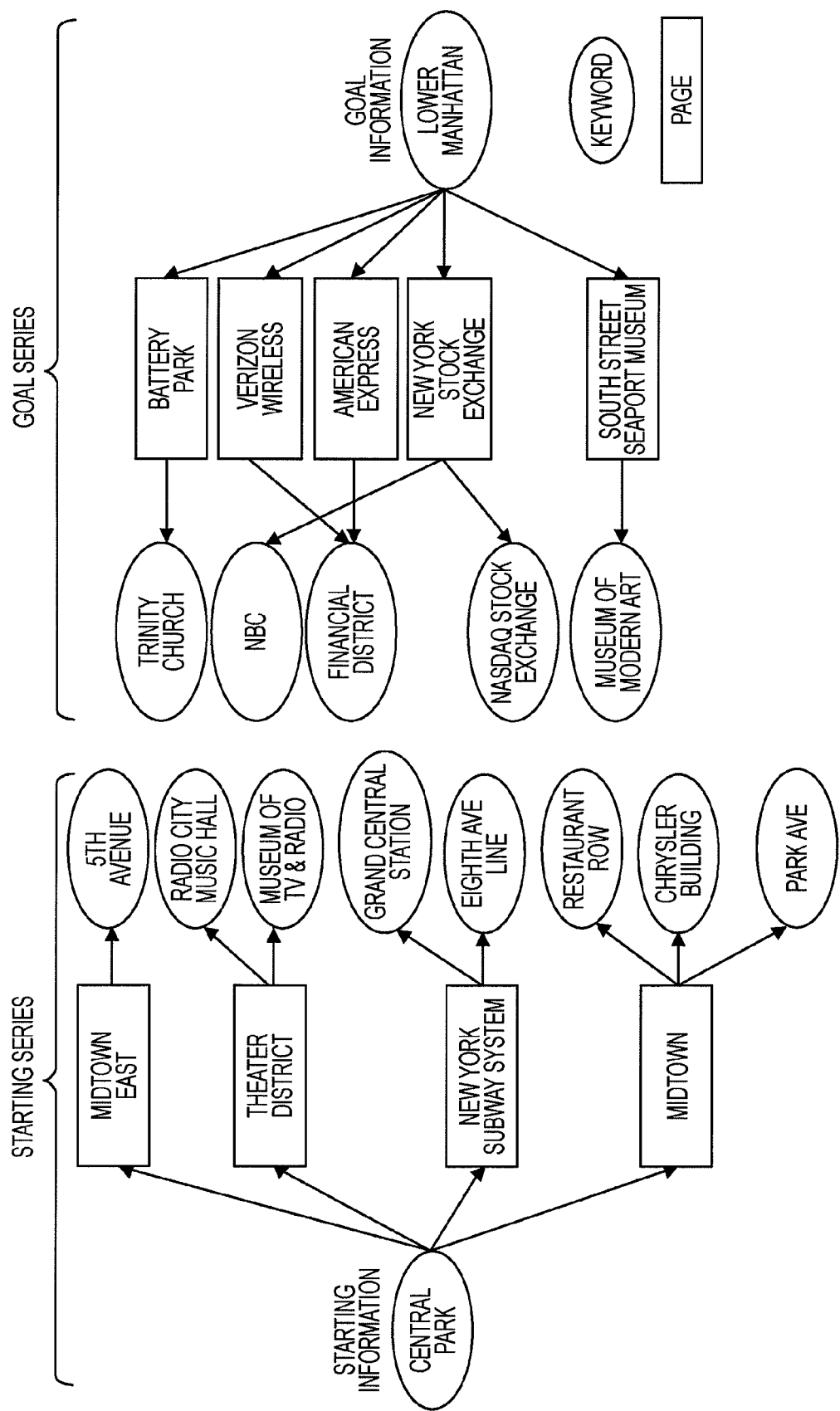
FIG. 17 is a diagram illustrating an example of starting series and goal series.

FIG. 17 shows a starting series after new connection information has been found with the forward action method, wherein web pages related to "Midtown East", "Theater District", "New York Subway System", and "Midtown" which are connection information of the starting series in FIG. 16, are each connection search targets, and shows a goal series after new connection information has been found with the forward action method, wherein web pages related to "Battery Park", "Verizon Wireless", "American Express", "New York Stock Exchange", and "South Street Seaport Museum" which are connection information of the goal series in FIG. 16, are each connection search targets.

In FIG. 17, the starting series is made up of connection information "Central Park";

web pages relating to "Midtown East", "Theatre District", "New York Subway System", and "Midtown" which are connection information found with a forward action method using the connection information "Central Park" as a connection search target;

web pages relating to the connection information "Midtown East" as a connection search target, the search text string "Fifth Avenue" serving as new connection information found with the forward action method;

web pages relating to the connection information "Theater District" as a connection search target, the search text strings "Radio City Music Hall" and "Museum of TV and Radio" serving as new connection information found with the forward action method;

web pages relating to the connection information "New York Subway System" as a connection search target, the search text strings "Grand Central Station" and "Eighth Avenue Line" serving as new connection information found with the forward action method; and web pages relating to the connection information "Midtown" as a connection search target, the search text strings "Restaurant Row", "Chrysler Building", and "Park Avenue" serving as new connection information found with the forward action method.

Also, in FIG. 17, the goal series is made up of connection information "Lower Manhattan";

web pages relating to "Battery Park", "Verizon Wireless", "American Express", "New York Stock Exchange", and "South Street Seaport Museum" which are connection information found with a forward action method using the connection information "Lower Manhattan" as a connection search target; and web pages relating to each of the connection information "Battery Park", "Verizon Wireless", "American Express", "New York Stock Exchange", and "South Street Seaport Museum" as connection search targets, the search text strings "Trinity Church", "NBC", "Financial District", "Nasdaq Stock Exchange", and "Museum of Modern Art" serving as new connection information found with the forward action method.

With the goal series in FIG. 17, the new connection information "Trinity Church" is found with a forward action method using web pages relating to the connection information "Battery Park" as a connection search target.

With the goal series in FIG. 17, the new connection information "NBC" and "Nasdaq Stock Exchange" are found with a forward action method using web pages relating to the connection information "New York Stock Exchange" as a connection search target.

With the goal series in FIG. 17, the new connection information "Financial District" is found with a forward action method using web pages relating to the connection information "American Express" as a connection search target, and using web pages relating to the connection information "New York Mercantile Exchange".

With the goal series in FIG. 17, the new connection information "Museum of Modern Art" is found with a forward action method using web pages relating to the connection information "South Street Seaport Museum" as a connection search target.

Figure 18:
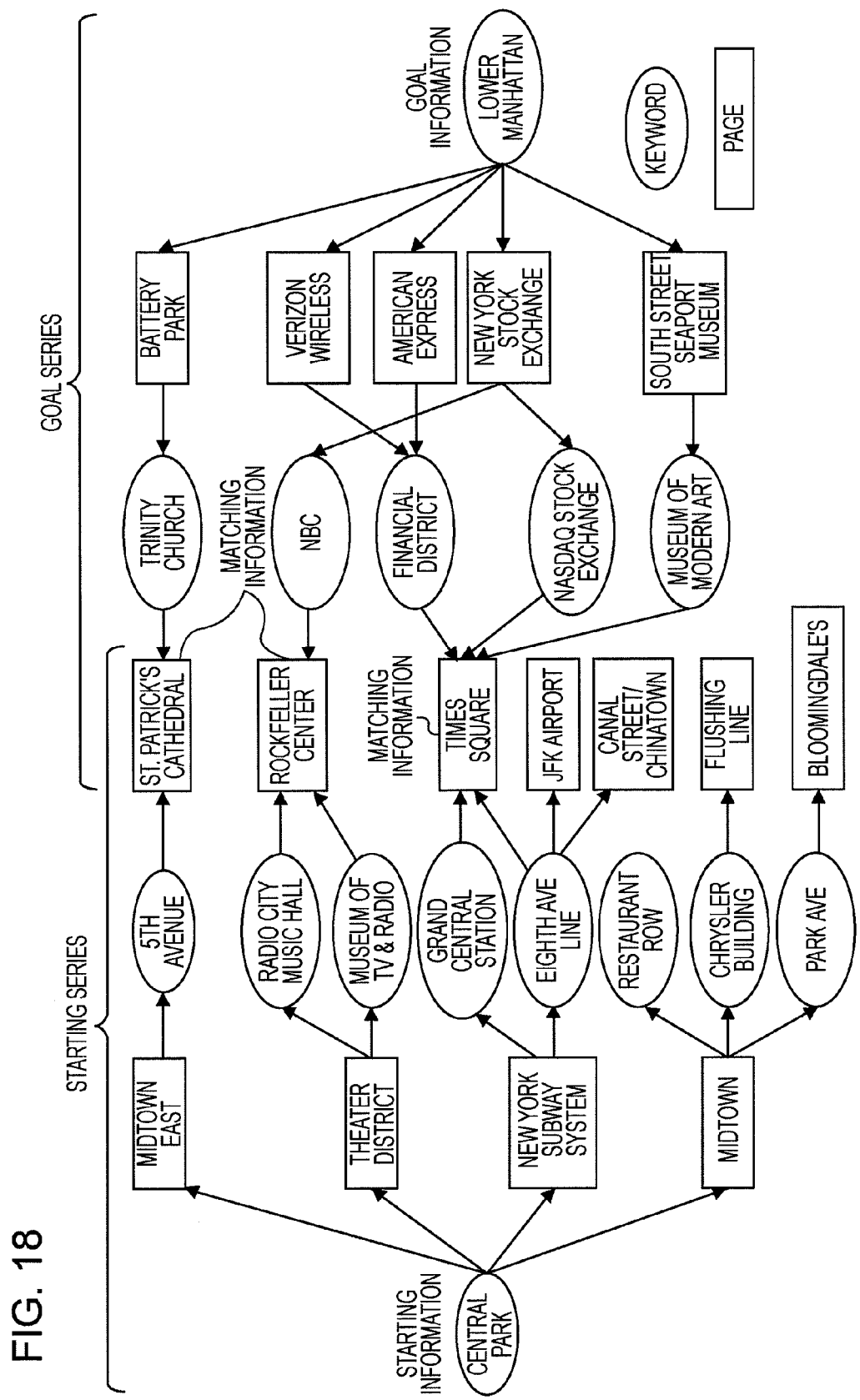
FIG. 18 is a diagram illustrating an example of starting series and goal series.

FIG. 18 shows the starting series following new connection information being found by a forward action method, with each connection information of the starting series in FIG. 17 "Fifth Avenue", "Radio City Music Hall", "Museum of TV and Radio", "Grand Central Station", "Eighth Avenue Line", "Restaurant Row", "Chrysler Building", and "Park Avenue" as connection search targets, and the goal series following new connection information being found by the forward action method, with each connection information of the goal series in FIG. 17 "Trinity Church", "NBC", "Financial District", "Nasdaq Stock Exchange", and "Museum of Modern Art".

In FIG. 18, the starting series is made up of connection information "Central Park";

web pages relating to "Midtown East", "Theatre District", "New York Subway System", and "Midtown" which are connection information found with a forward action method using the connection information "Central Park" as a connection search target;

connection information "Fifth Avenue", "Radio City Music Hall", "Museum of TV and Radio", "Grand Central Station", "Eighth Avenue Line", "Restaurant Row", "Chrysler Building", and "Park Avenue" found with a forward action method using each web page relating to the connection information "Midtown East", "Theatre District", "New York Subway System", and "Midtown" as connection search targets; and web pages relating to "St. Patrick's Cathedral", "Rockefeller Center", "Times Square", "JFK Airport", "Canal Street/Chinatown", "Flushing Line", and "Bloomingdale's" which is new connection information found with a forward action method using each of the connection information "Fifth Avenue", "Radio City Music Hall", "Museum of TV and Radio", "Grand Central Station", "Eighth Avenue Line", "Restaurant Row", "Chrysler Building", and "Park Avenue" as connection search targets.

With the starting series in FIG. 18, web pages relating to the new connection information "St. Patrick's Cathedral" is found with a forward action method using the connection information "Fifth Avenue" as a connection search target.

Also, with the starting series in FIG. 18, web pages relating to the new connection information "Rockefeller Center" is found with a forward action method using the connection information "Radio City Music Hall" and the connection information "Museum of TV and Radio" each as connection search targets.

Further, with the starting series in FIG. 18, web pages relating to the new connection information "Times Square" is found with a forward action method using the connection information "Grand Central Station" and "Eighth Avenue Line" each as connection search targets.

Further, with the starting series in FIG. 18, web pages relating to the new connection information "JFK Airport" and "Canal Street/Chinatown" is found with a forward action method using the connection information "Eighth Avenue Line" as a connection search target.

Further, with the starting series in FIG. 18, web pages relating to the new connection information "Flushing Line" is found with a forward action method using the connection information "Chrysler Building" as a connection search target.

Further, with the starting series in FIG. 18, web pages relating to the new connection information "Bloomingdale's" is found with a forward action method using the connection information "Park Avenue" as a connection search target.

In FIG. 18, the goal series is made up of connection information "Lower Manhattan";

web pages relating to "Battery Park", "Verizon Wireless", "American Express", "New York Stock Exchange", and "South Street Seaport Museum" which are connection information found with a forward action method using the connection information "Lower Manhattan" as a connection search target;

connection information "Trinity Church", "NBC", "Financial District", "Nasdaq Stock Exchange", and "Museum of Modern Art" found with a forward action method using each web page relating to the connection information "Battery Park", "Verizon Wireless", "American Express", "New York Stock Exchange", and "South Street Seaport Museum" as connection search targets; and web pages relating to "St. Patrick's Cathedral", "Rockefeller Center", and "Times Square", which is new connection information found with a forward action method using each of the connection information "Trinity Church", "NBC", "Financial District", "Nasdaq Stock Exchange", and "Museum of Modern Art" as connection search targets.

With the goal series in FIG. 18, web pages relating to the new connection information "St. Patrick's Cathedral" is found with a forward action method using the connection information "Trinity Church" as a connection search target.

Also, with the goal series in FIG. 18, web pages relating to the new connection information "Rockefeller Center" is found with a forward action method using the connection information "NBC" as a connection search target.

Further with the goal series in FIG. 18, web pages relating to the new connection information "Times Square" is found with a forward action method using each of the connection information "Financial District", "Nasdaq Stock Exchange", and "Museum of Modern Art" as connection search targets.

With the starting series in FIG. 18, the connection information "St. Patrick's Cathedral", "Rockefeller Center", and "Times Square" is matching information since these exist in the goal series, and in the starting information processing which follows, each of "St. Patrick's Cathedral", "Rockefeller Center", and "Times Square" is used as a connection search target, whereby new connection information is found with the forward action method.

With the starting series, upon the goal information "Lower Manhattan" being found as connection information, the starting information processing unit 91 (FIG. 12) outputs a starting series including the connection information "Lower Manhattan" as an action plan that includes the starting information "Central Park" and the goal information "Lower Manhattan", whereby the starting information processing is ended.

Also, with the goal series in FIG. 18, the connection information "St. Patrick's Cathedral", "Rockefeller Center", and "Times Square" is matching information since these exist in the starting series, and in the goal information processing which follows, each of "St. Patrick's Cathedral", "Rockefeller Center", and "Times Square" is used as a connection search target, whereby new connection information is found with the forward action method.

With the goal series, upon the starting information "Central Park" being found as connection information, the goal information processing unit 92 (FIG. 12) outputs a goal series including the connection information "Central Park" as an action plan that includes the starting information "Central Park" and the goal information "Lower Manhattan", whereby the goal information processing is ended.

Figure 19:
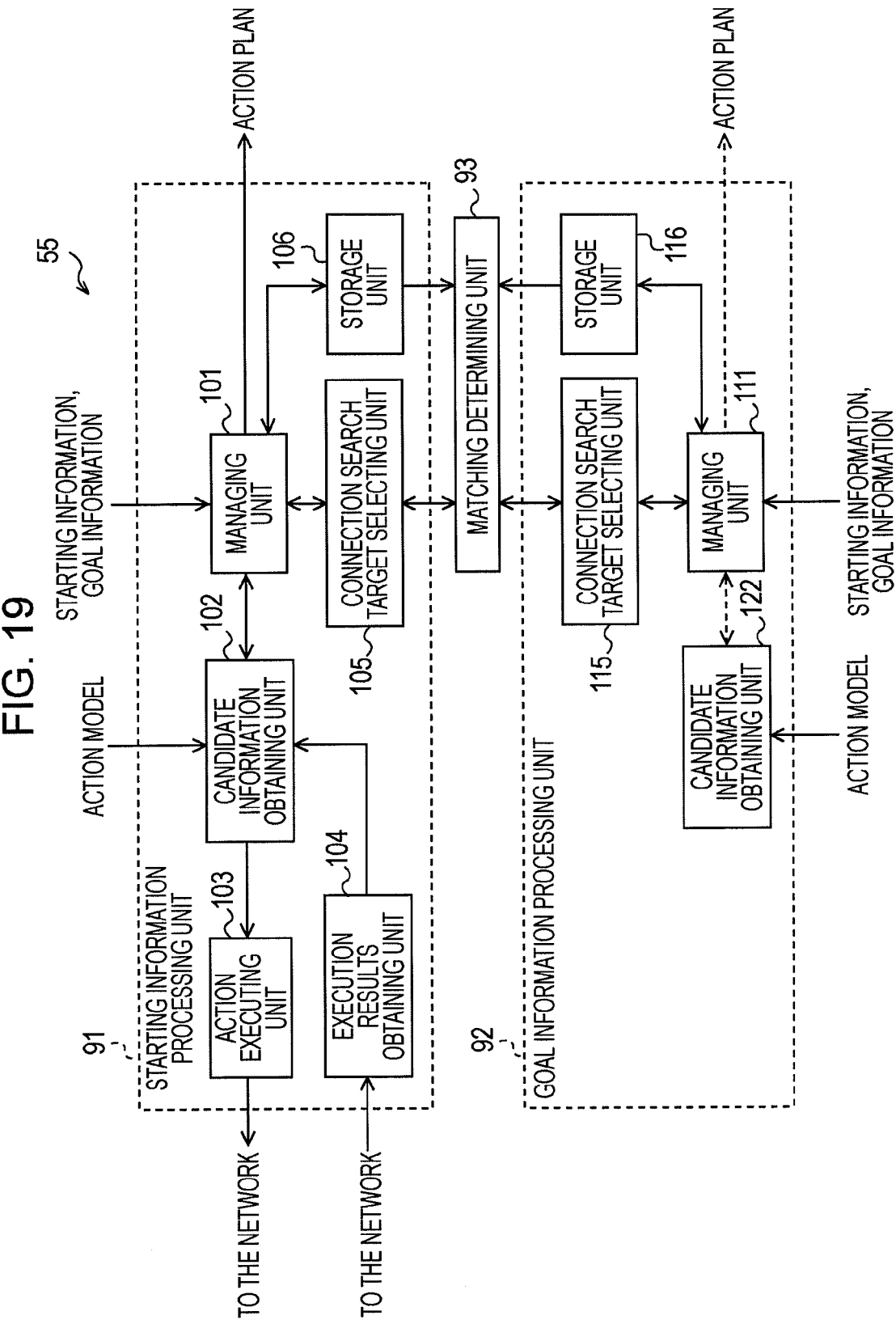
FIG. 19 is a block diagram illustrating a second configuration example of the starting information processing unit and goal information processing unit.

Next, FIG. 19 shows a second configuration example of the starting information processing unit 91 and goal information processing unit 92 of the connection searching unit 55 in FIG. 10.

Note that the portions in the diagram which correspond to the case in FIG. 12 are denoted with the same reference numerals and the description thereof will be omitted as appropriate hereafter.

That is to say, in FIG. 19, the starting information processing unit 19 is configured similar to the case in FIG. 12.

Also, in FIG. 19, the goal information processing unit 92 is common with the case in FIG. 12 in that a managing unit 111, connection search target selecting unit 115, and storage unit 116 are provided. However, the goal information processing unit 92 in FIG. 19 differs from the case in FIG. 12 in that instead of a candidate information obtaining unit 112, a candidate information obtaining unit 122 is provided, and the action executing unit 113 and execution result obtaining unit 114 are not provided.

With the connection searching unit 55 in FIG. 19, the starting information processing unit 91 finding the related information obtained from the action model, when the connection information becomes input information as new connection information to serve as the starting information processing, is performed with the starting information as an initial value of the connection information, and the goal information processing unit 92 finding the input information obtained from the action model, with the connection information serving as related information, as new connection information to serve as the goal information processing, is performed with the goal information as an initial value of the connection information.

Also, the starting information processing unit 91 and goal information processing unit 92 find new connection information that connects to the connection search target, the connection information having become matching information serving as the connection search target to find new connection information.

Accordingly, in FIG. 19, the starting series is configured in the starting information processing unit 91 with the forward action method similar to the case in FIG. 12, and the goal series is configured in the goal information processing unit 92 with the backward action method described in FIG. 3.

With the goal information processing unit 92 in FIG. 19, an action model is supplied to the candidate information obtaining 122 from the action model generating unit 54 (FIG. 4).

In accordance with control by the managing unit 111, the candidate information obtaining unit 122 uses the action model from the action model generating unit 54 to find a candidate for new connection information to connect to the connection search target, and supplies this to the managing unit 111.

That is to say, the managing unit 111 supplies the connection search target from the connection search target selecting unit 115 out of the connection information of the goal series (action plan), to the candidate information obtaining unit 122, and requests the candidate information obtaining unit 122 to obtain candidate information for new connection information that connects to the connection search target thereof.

In response to the request from the managing unit 111, the candidate information obtaining unit 122 uses the action model from the action model generating unit 54 to find candidate information for new connection information that connects to the connection search target from the managing unit 111, and supplies this to the managing unit 111.

However, the candidate information obtaining unit 122 differs from the candidate information obtaining unit 112 in FIG. 12 in that the candidate information is found with a backward action method instead of a forward action method.

That is to say, the candidate information obtaining unit 122 finds the input information when the connection information is obtained as related information from the action model, as candidate information for new connection information.

Note that with the candidate information obtaining unit 112 that finds candidate information with the forward action method, in the case there is connection search target that has not been able to find candidate information (connection search target finding candidate information with low reliability), the action executing unit 113 (FIG. 12) is controlled to use the external information searching device 12 (FIG. 1) or the external information database 13 to find candidate information, but with the candidate information obtaining unit 122 that finds candidate information with the backward method, finding candidate information for a connection search target that has not been able to find candidate information is ended.

With the candidate information obtaining unit 122, finding the candidate information for connection search target that has not been able to find candidate information using an action model is thus ended because, with the backward action method, for example, if we give an example of a search action which searches web pages including a search text string which is input information and obtains the web page as related information, in the case that a web page which is a search result is provided, the search text string used to search such sub page has to be obtained, whereby obtaining such search text string using the external information searching device 12 and information database 13 is difficult.

Next, the goal information processing performed by the goal information processing unit 92 in FIG. 19 will be described with reference to the flowchart in FIG. 20.

The goal information processing is started when the starting information and goal information is supplied to the managing unit 111 of the goal information processing unit 92 from the obtaining unit 51 (FIG. 4).

With the goal information processing, in step S81 the managing unit 111 sets the goal information from the obtaining unit 51 as an initial value of the connection information in the goal series, i.e. configures the goal series to include only the goal information as connection information, supplies and stores this in the storage unit 116, and the flow is advanced to step S82.

In step S82, the managing unit 111 selects the goal information as the connection search target and supplies this to the candidate information obtaining unit 112, while requesting the candidate information obtaining unit 122 to obtain candidate information of the new connection information that connects to the connection search target, and the flow is advanced to step S83.

In response to the request from the managing unit 111, in step S83, the candidate information obtaining unit 122 uses the action model stored in the action model generating unit 54, and finds candidate information for the new connection information connecting to the connection search targets which are each connection search targets from the managing unit 111 with the backward action method, and the flow is advanced to step S84.

In step S84, the candidate information obtaining unit 122 determines whether or not there are any connection search targets (connection search targets that have found candidate information without low reliability) that have been able to find candidate information with the backward action method using an action model.

In the case determination is made in step S84 that there are no connection search targets that have been able to find candidate information with the backward action method using an action model, i.e. in the case that the candidate information found for all of the connection search targets are candidate information with low reliability, the goal information processing is ended.

Accordingly, in the case that the candidate information found for all of the connection search targets is candidate information with low reliability, configuring the goal series (continuing to connect connection information from the goal information) is ended at that point in time.

On the other hand, in the case determination is made in step S84 that there are connection search targets that have been able to find candidate information with the backward action method using an action model, the candidate information obtaining unit 122 supplies the candidate information found for the connection search target (candidate information without low reliability) to the managing unit 111, and the flow is advanced to step S85.

In step S85, the managing unit 111 selects new connection information that connects to the connection search targets from the candidate information for each connection search target from the candidate information obtaining unit 122 in order to restrict the number of pieces of connection information, and the flow is advanced to step S86.

In step S86, the managing unit 111 includes the new connection information selected for each connection search target in step S85 in the goal series in a form to connect to the connection search target, and stores the goal series thereof in the storage unit 116 so as to overwrite.

Further, the managing unit 111 supplies the new connection information selected for each connection search target to the connection search target selecting unit 115, while requesting the connection search target selecting unit 115 to select the connection search target from the new connection information, and the flow is advanced from step S86 to step 87.

In step S87, the connection search target selecting unit 115 requests the matching determining unit 93 to perform matching determining as to whether or not the new connection information from the managing unit 111 (new connection information of the goal series) is matching information that matches one of the pieces of connection information making up the starting series, awaits the determination results from the matching determining to be supplied from the matching determining unit 93, and determines whether or not one or more pieces of new connection information in the goal series is matching information that matches one of the connection information making up the starting series stored in the storage unit 106 of the starting information processing unit 91.

In the case determination is made in step S87 that all of the new connection information of the goal series is not matching information, the flow is advanced to step S88, and the connection search target selecting unit 115 selects all of the new connection information of the goal series as the connection search target, and supplies this to the managing unit 111.

The managing unit 111 supplies the connection search target from the connection search target selecting unit 115, i.e. in the current case all of the new connection information in the goal series, to the candidate information obtaining unit 122, and then requests the candidate information obtaining unit 122 to obtain the candidate information of new connection information that connects to the connection search target thereof, and the flow returns to step S83 and similar processing thereafter is repeated.

Also, in the case determination is made in step S87 that one or more pieces of new connection information of the goal series is matching information, the flow is advanced to step S89, and the connection search target selecting unit 115 selects the new connection information which is matching information out of the new connection information of the goal series as a connection search target, supplies this to the managing unit 111, and the flow is advanced to step S90.

In step S90, the managing unit 111 determines whether or not one of the connection search target from the connection search target selecting unit 115, i.e. in the current case one of the new connection information which is matching information out of the new connection information of the goal series, matches the starting information from the obtaining unit 51 (FIG. 4).

In the case determination is made in step S90 that none of the new connection information (here, connection search target) which is matching information in the goal series matches the starting information, the managing unit 111 supplies the connection search target from the connection search target selecting unit 115, i.e. in the current case the new connection information which is matching information in the goal series to the candidate information obtaining unit 122, while requesting the candidate information obtaining unit 122 to obtain the candidate information of the new connection information that connects to the connection search target, the flow is returned to step S83, and thereafter similar processing is repeated.

In the case determination is made in step S90 that one of the new connection information which is matching information in the goal series matches the starting information, i.e. the goal series of which the configuration is started with the goal information as the initial value of the connection information includes the starting information as connection information, and accordingly, in the case that an action plan showing the connections between the starting information and goal information is configured, the flow is advanced to step S91, and the managing unit 111 reads the action plan stored in the storage unit 116, i.e. the action plan showing the connections between the starting information and goal information, outputs this to the search result output unit 52, and ends the goal information processing.

With the connection searching unit 55 in FIG. 19, new connection information is found with the forward action method with the starting information processing unit 91, and new connection information is found with the backward action method with the goal information processing unit 92.

That is to say, with the starting information processing unit 91, upon the connection information which is a connection search target set as input information, the related information obtained from the action model is found as new connection information. On the other hand, with the goal information processing unit 92, when the related information obtained from the action model is a connection search target, the input information corresponding to the related information thereof is found as new connection information that connects to the connection search target.

Accordingly, the connection search processing performed with the connection searching unit 55 in FIG. 19 (starting information processing and goal information processing and so forth) differs from the case of FIG. 12 wherein new connection information is found with the forward action method for either of the starting unit formation processing unit 91 and goal information processing unit 92, and theoretically an action plan (connection information series) having directionality from the starting information to the goal information can be obtained.

That is to say, with the connection searching unit 55 in FIG. 19, a different action plan is obtained in the case of performing connection searching processing wherein one of the two search target information obtained with the obtaining unit 51 is the starting information and the other is the goal information, and in the case of performing connection searching processing wherein one is the goal information and the other is the starting information.

Figure 20:
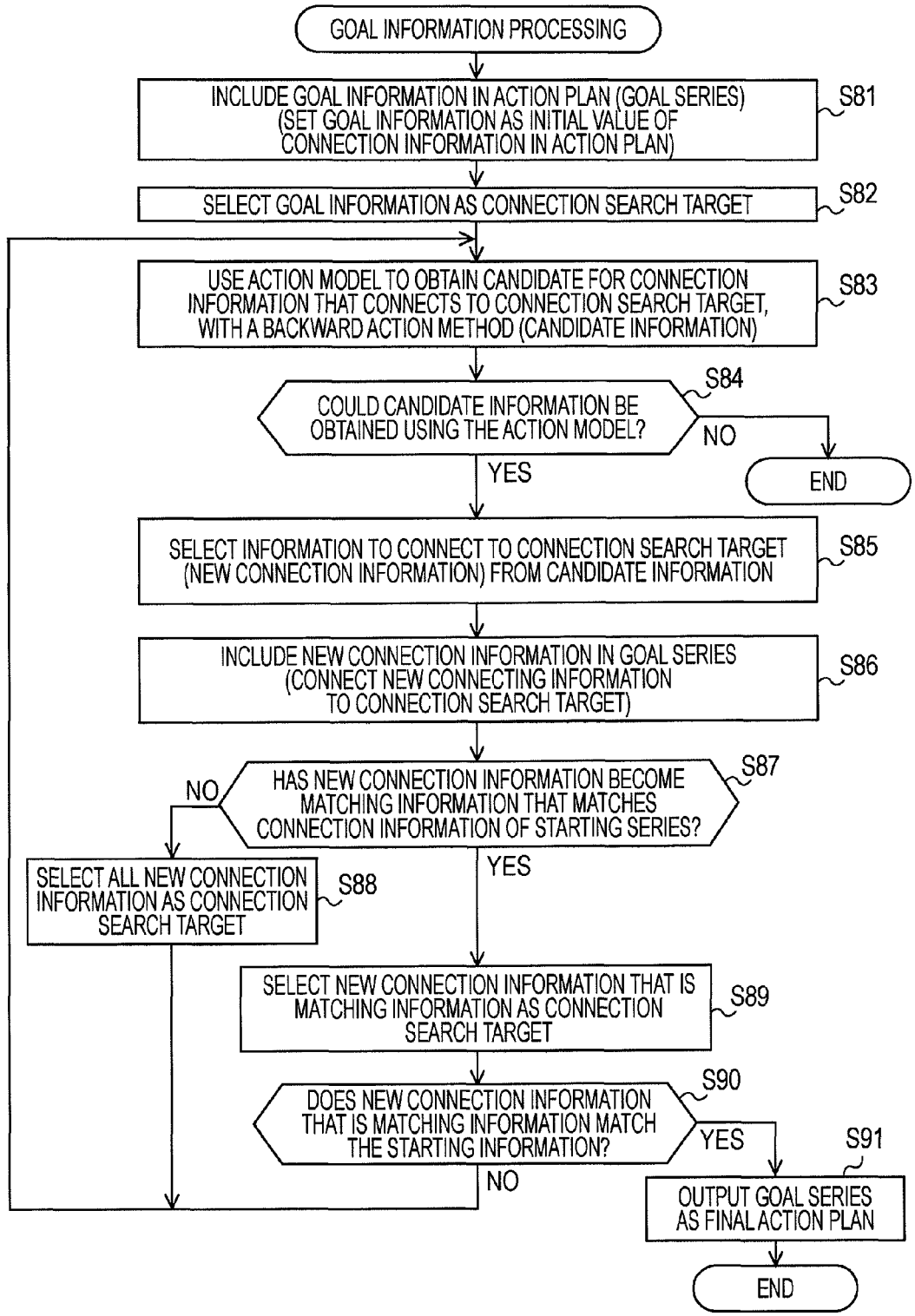
FIG. 20 is a flowchart describing the goal information processing.

Note that as described above, if we say that the time from the connection information being included in the starting series and goal series until the next new connection information is included is one cycle processing, with the starting information processing in FIG. 13 and the goal information processing in FIG. 20, one cycle processing can be performed simultaneously, or one cycle processing can be performed alternately.

Also, an arrangement may be made wherein, with the starting information processing in FIG. 13, one cycle processing is performed multiple times and thereafter with the goal information processing in FIG. 20, one cycle processing is performed one time or repeated multiple times, or an arrangement may be made wherein, with the starting information processing in FIG. 13, one cycle processing is performed one time and thereafter with the goal information processing in FIG. 20, one cycle processing is repeatedly performed multiple times.

Further, with the starting information processing in FIG. 13 and the goal information processing in FIG. 20, the goal information processing in FIG. 20 is performed first, and upon the goal information processing thereof ending, the starting information processing in FIG. 13 can be performed.

Next, an action plan (starting series and goal series) made up of the starting information processing performed with the starting information processing unit 91 and the goal information processing performed with the goal information processing unit 92 in the connection searching unit 55 in FIG. 19 will be described with reference to FIGS. 21 through 26.

Note that in FIGS. 21 through 26, similar to the above-described FIGS. 15 through 18, the search text string (keyword) "Central Park" is the starting information and the search text string "Lower Manhattan" is the goal information.

Figure 21:
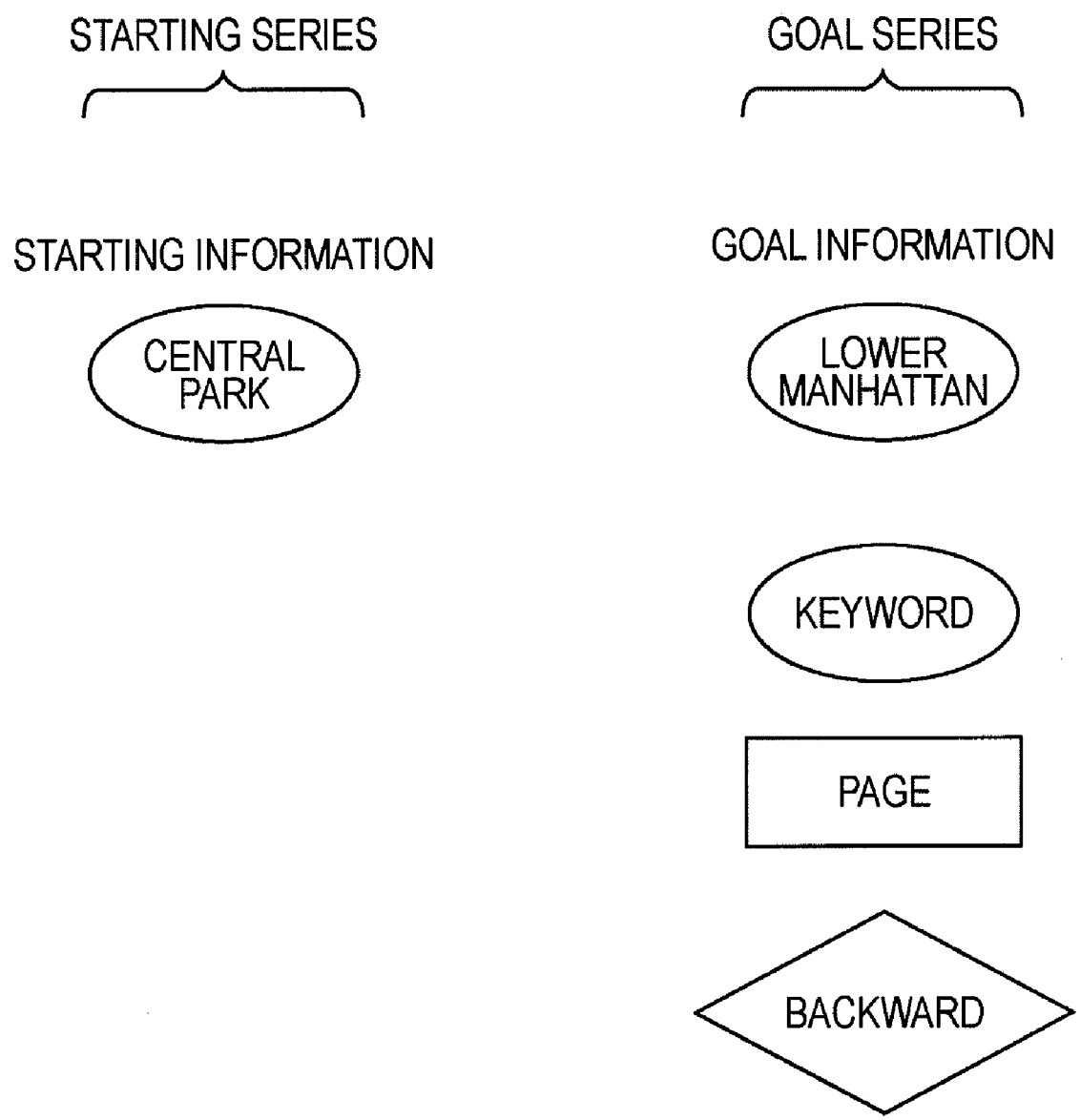
FIG. 21 is a diagram illustrating an example of starting series and goal series.

FIG. 21 shows a starting series immediately following the start of the starting information processing and a goal series immediately following the start of the goal information processing.

In FIG. 21, the starting series is made up from only the connection information "Central Park" which is the starting information, and the goal series is made up from only the connection information "Lower Manhattan" which is the goal information.

In FIG. 22, the connection information "Central Park", which is the starting information, serves as the connection search target whereby a starting series following new connection information being found with a forward action method is shown, and the connection information "Lower Manhattan", which is the goal information, serves as the connection search target whereby a goal series following new connection information being found with a backward action method is shown.

In FIG. 22, the starting series is made up of web pages relating to the connection information "Central Park", which is the starting information, and "Midtown East", "Theater District", "NY Subway System", and "Midtown" which are new connection information found with the forward action method using the connection information "Central Park" as the connection search target.

Also, in FIG. 22, the goal series is made up of web pages relating to the connection information "Lower Manhattan", which is the goal information, and "Battery Park", "Verizon Wireless", "New York Stock Exchange", and "South Street Seaport Museum" which are new connection information found with the backward action method using the connection information "Lower Manhattan" as the connection search target.

Figure 23:
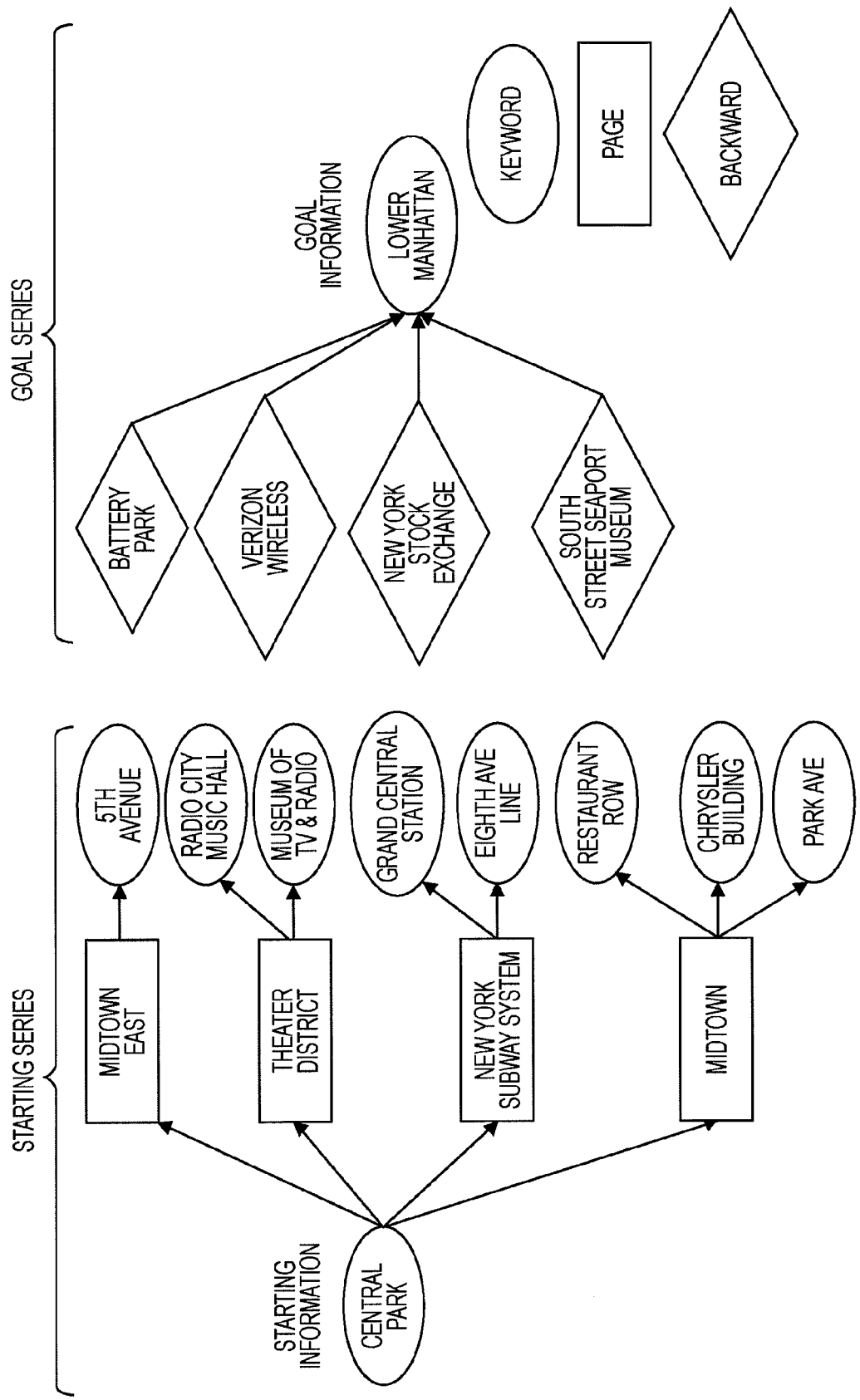
FIG. 23 is a diagram illustrating an example of starting series and goal series.

FIG. 23 shows a starting series after new connection information has been found with the forward action method, wherein web pages related to "Midtown East", "Theater District", "New York Subway System", and "Midtown" which are connection information of the starting series in FIG. 22, are each connection search targets, and shows a goal series after new connection information has been found with the backward action method, wherein web pages related to "Battery Park", "Verizon Wireless", "New York Stock Exchange", and "South Street Seaport Museum" which are connection information of the goal series in FIG. 22, are each connection search targets.

In FIG. 23, the starting series is made up of connection information "Central Park";

web pages relating to "Midtown East", "Theatre District", "New York Subway System", and "Midtown" which are connection information found with a forward action method using the connection information "Central Park" as a connection search target;

web pages relating to the connection information "Midtown East" as a connection search target, the search text string "Fifth Avenue" serving as new connection information found with the forward action method;

web pages relating to the connection information "Theater District" as a connection search target, the search text strings "Radio City Music Hall" and "Museum of TV and Radio" serving as new connection information found with the forward action method;

web pages relating to the connection information "New York Subway System" as a connection search target, the search text strings "Grand Central Station" and "Eighth Avenue Line" serving as new connection information found with the forward action method; and web pages relating to the connection information "Midtown" as a connection search target, the search text strings "Restaurant Row", "Chrysler Building", and "Park Avenue" serving as new connection information found with the forward action method.

Also, in FIG. 23, the goal series is made up of connection information "Lower Manhattan"; and web pages relating to "Battery Park", "Verizon Wireless", "New York Stock Exchange", and "South Street Seaport Museum" which are connection information found with a backward action method using the connection information "Lower Manhattan" as a connection search target.

That is to say, in FIG. 23, the web pages relating to the goal series connection information "Battery Park", "Verizon Wireless", "New York Stock Exchange", and "South Street Seaport Museum", each as connection search targets, candidate information cannot be found with the backward action method (step S84 in FIG. 20), so the goal information processing is ended, and the goal series is left as in the state in FIG. 22.

Figure 24:
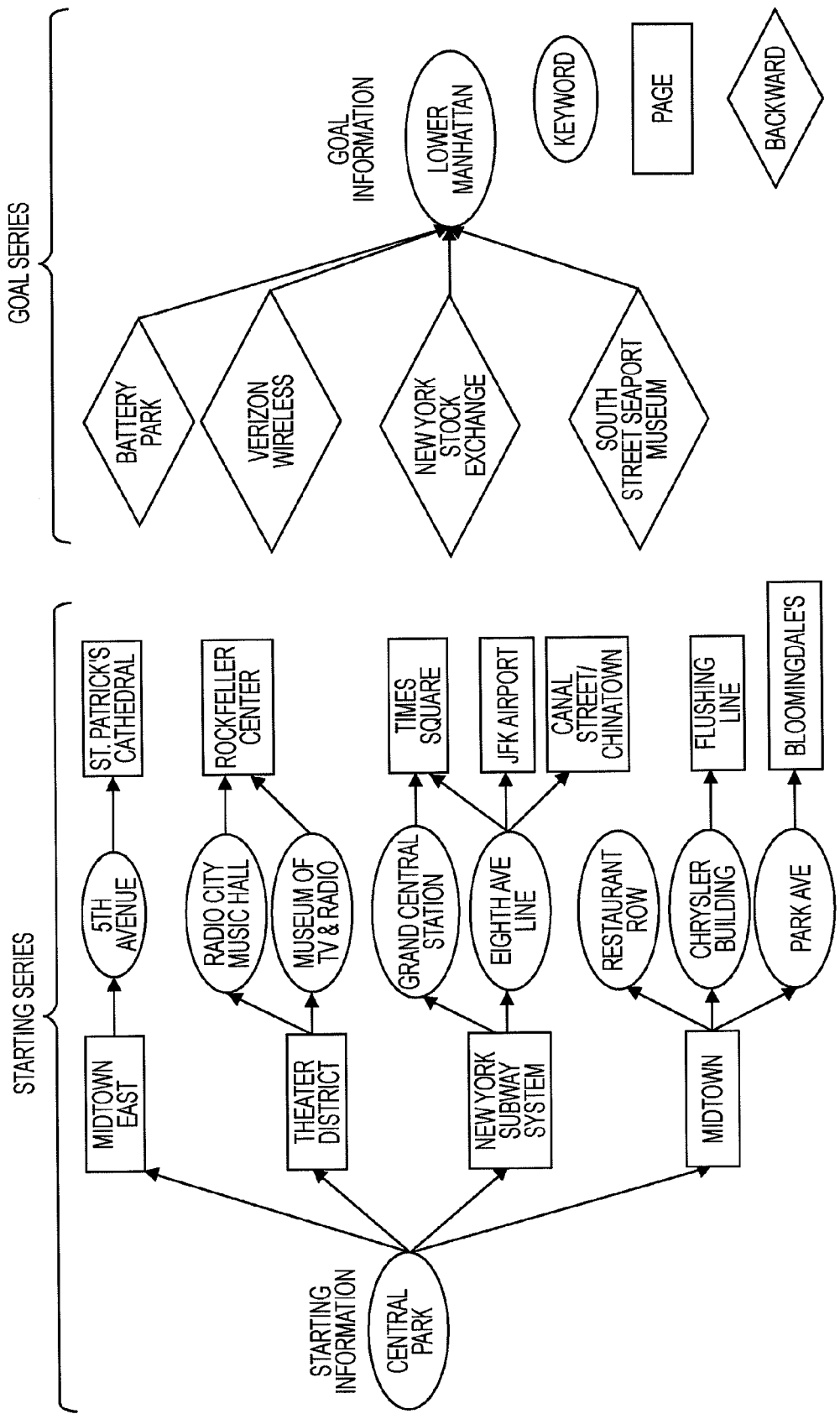
FIG. 24 is a diagram illustrating an example of starting series and goal series.
Figure 25:
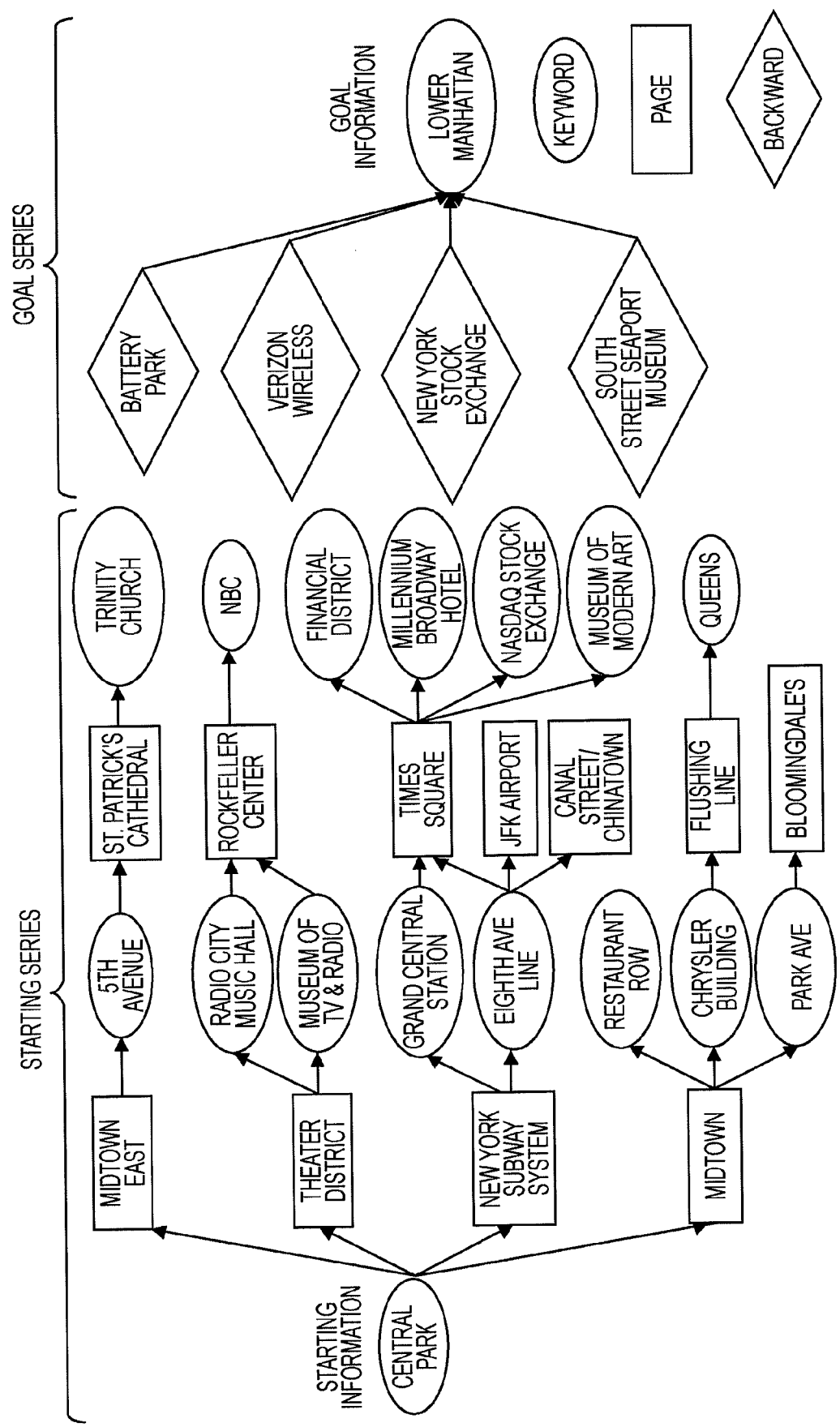
FIG. 25 is a diagram illustrating an example of starting series and goal series.
Figure 26:
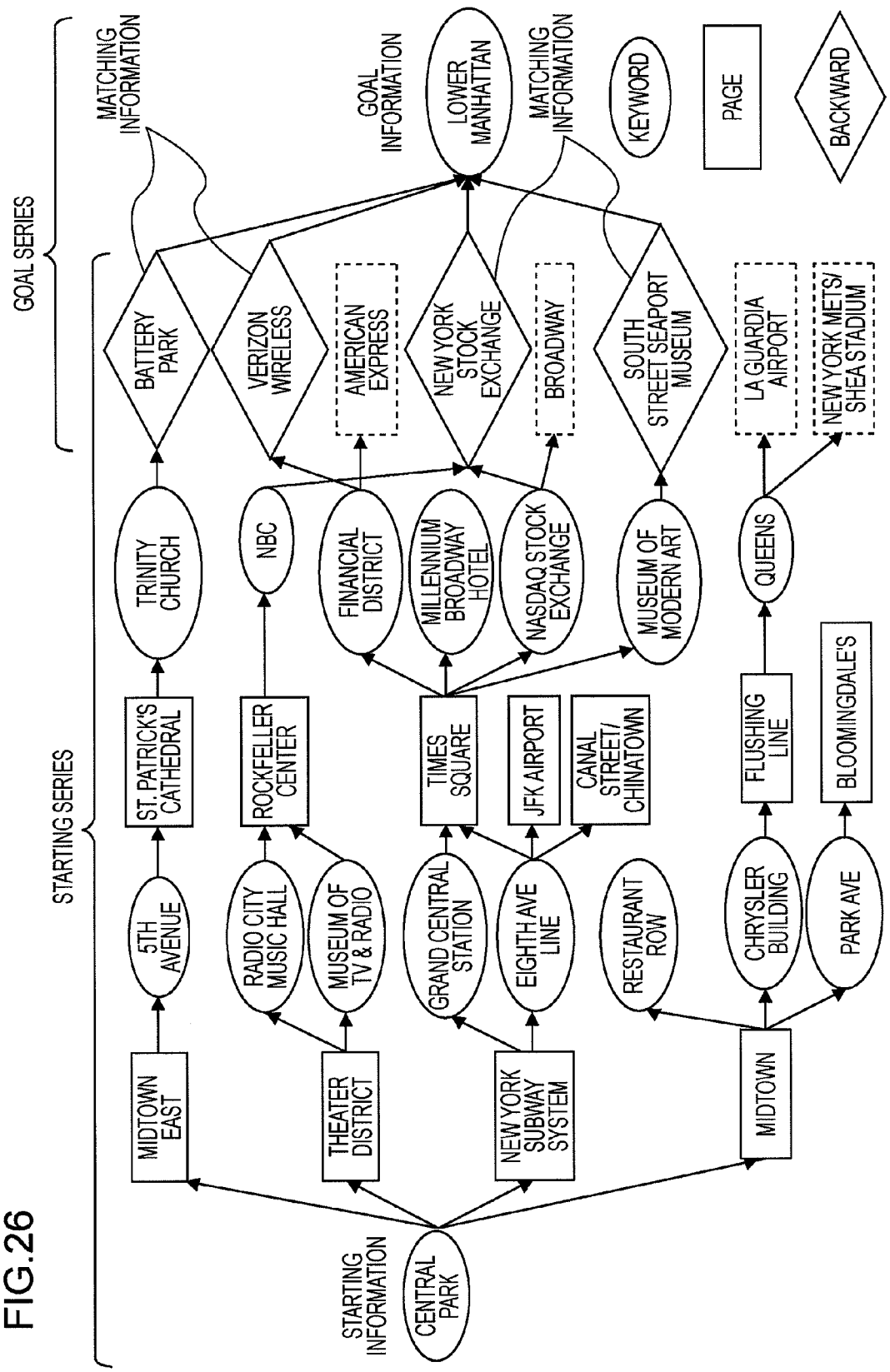
FIG. 26 is a diagram illustrating an example of starting series and goal series.

In FIGS. 24 through 26 to be described below also, the goal series is left as in the state in FIG. 22, so the description thereof will be omitted as appropriate.

FIG. 24 shows the starting series following new connection information being found by a forward action method, with each connection information of the starting series in FIG. 23 "Fifth Avenue", "Radio City Music Hall", "Museum of TV and Radio", "Grand Central Station", "Eighth Avenue Line", "Restaurant Row", "Chrysler Building", and "Park Avenue" as connection search targets, and the goal series following goal information processing having ended.

In FIG. 24, the starting series is made up of connection information "Central Park";

web pages relating to "Midtown East", "Theatre District", "New York Subway System", and "Midtown" which are connection information found with a forward action method using the connection information "Central Park" as a connection search target;

connection information "Fifth Avenue", "Radio City Music Hall", "Museum of TV and Radio", "Grand Central Station", "Eighth Avenue Line", "Restaurant Row", "Chrysler Building", and "Park Avenue" found with a forward action method using each web page relating to the connection information "Midtown East", "Theatre District", "New York Subway System", and "Midtown" as connection search targets; and web pages relating to "St. Patrick's Cathedral", "Rockefeller Center", "Times Square", "JFK Airport", "Canal Street/Chinatown", "Flushing Line", and "Bloomingdale's" which is new connection information found with a forward action method using each of the connection information "Fifth Avenue", "Radio City Music Hall", "Museum of TV and Radio", "Grand Central Station", "Eighth Avenue Line", "Restaurant Row", "Chrysler Building", and "Park Avenue" as connection search targets.

With the starting series in FIG. 24, web pages relating to the new connection information "St. Patrick's Cathedral" is found with a forward action method using the connection information "Fifth Avenue" as a connection search target.

Also, with the starting series in FIG. 24, web pages relating to the new connection information "Rockefeller Center" is found with a forward action method using the connection information "Radio City Music Hall" and the connection information "Museum of TV and Radio" each as connection search targets.

Further, with the starting series in FIG. 24, web pages relating to the new connection information "Times Square" is found with a forward action method using the connection information "Grand Central Station" and "Eighth Avenue Line" each as connection search targets.

Further, with the starting series in FIG. 24, web pages relating to the new connection information "JFK Airport" and "Canal Street/Chinatown" is found with a forward action method using the connection information "Eighth Avenue Line" as a connection search target.

Further, with the starting series in FIG. 24, web pages relating to the new connection information "Flushing Line" is found with a forward action method using the connection information "Chrysler Building" as a connection search target.

Further, with the starting series in FIG. 24, web pages relating to the new connection information "Bloomingdale's" is found with a forward action method using the connection information "Park Avenue" as a connection search target.

FIG. 25 shows the starting series following new connection information being found by a forward action method, wherein web pages relating to the starting series connection information in FIG. 24 "St. Patrick's Cathedral", "Rockefeller Center", "Times Square", and "Flushing Line" as connection search targets, and the goal series following goal information processing having ended.

In FIG. 25, the starting series is made up of connection information "Central Park";

web pages relating to "Midtown East", "Theatre District", "New York Subway System", and "Midtown" which are connection information found with a forward action method using the connection information "Central Park" as a connection search target;

the connection information "Fifth Avenue", "Radio City Music Hall", "Museum of TV and Radio", "Grand Central Station", "Eighth Avenue Line", "Restaurant Row", "Chrysler Building", and "Park Avenue" found with the forward action method, using each of the web pages relating to the connection information "Midtown East" "Theatre District", "New York Subway System", and "Midtown" as connection search targets;

web pages relating to the new connection information "St. Patrick's Cathedral", "Rockefeller Center", "Times Square", "JFK Airport", "Canal Street/Chinatown", "Flushing Line", and "Bloomingdale's", obtained with the forward action method wherein the connection information "Fifth Avenue", "Radio City Music Hall", "Museum of TV and Radio", "Grand Central Station", "Eighth Avenue Line", "Restaurant Row", "Chrysler Building", and "Park Avenue" are each connection search targets; and search text strings "Trinity Church", "NBC", "Financial District", "Millennium Broadway Hotel", "Nasdaq Stock Exchange", "Museum of Modern Art", and "Queens" serving as new connection information found with the forward action method, wherein the web pages relating to the new connection information "St. Patrick's Cathedral", "Rockefeller Center", "Times Square", "JFK Airport", "Canal Street/Chinatown", "Flushing Line", and "Bloomingdale's" are each connection search targets.

With the starting series in FIG. 25, the new connection information "Trinity Church" is found with a forward action method using web pages relating to the connection information "St. Patrick's Cathedral" as a connection search target.

Also, with the starting series in FIG. 25, the new connection information "NBC" is found with a forward action method using web pages relating to the connection information "Rockefeller Center" as a connection search target.

Further, with the starting series in FIG. 25, the new connection information "Financial District", "Millennium Broadway Hotel", "Nasdaq Stock Exchange", and "Museum of Modern Art" is found with a forward action method using web pages relating to the connection information "Times Square" as connection search targets.

Also, with the starting series in FIG. 25, the new connection information "Queens" is found with a forward action method using web pages relating to the connection information "Flushing Line" as a connection search target.

FIG. 26 shows the starting series following new connection information being found by a forward action method, with each connection information of the starting series in FIG. 25 "Trinity Church", "NBC", "Financial District", "Nasdaq Stock Exchange", and "Museum of Modern Art" as connection search targets, and the goal series following goal information processing having ended.

In FIG. 26, the starting series is made up of connection information "Central Park";

web pages relating to "Midtown East", "Theatre District", "New York Subway System", and "Midtown" which are connection information found with a forward action method using the connection information "Central Park" as a connection search target;

the connection information "Fifth Avenue", "Radio City Music Hall", "Museum of TV and Radio", "Grand Central Station", "Eighth Avenue Line", "Restaurant Row", "Chrysler Building", and "Park Avenue" found with the forward action method, using each of the web pages relating to the connection information "Midtown East" "Theatre District", "New York Subway System", and "Midtown" as connection search targets;

web pages relating to the new connection information "St. Patrick's Cathedral", "Rockefeller Center", "Times Square", "JFK Airport", "Canal Street/Chinatown", "Flushing Line", and "Bloomingdale's", obtained with the forward action method wherein the connection information "Fifth Avenue", "Radio City Music Hall", "Museum of TV and Radio", "Grand Central Station", "Eighth Avenue Line", "Restaurant Row", "Chrysler Building", and "Park Avenue" are each connection search targets;

search text strings serving as the connection information "Trinity Church", "NBC", "Financial District", "Millennium Broadway Hotel", "Nasdaq Stock Exchange", "Museum of Modern Art", and "Queens" found with the forward action method, using each of the web pages relating to the connection information "St. Patrick's Cathedral", "Rockefeller Center", "Times Square", "JFK Airport", "Canal Street/Chinatown", "Flushing Line", and "Bloomingdale's", as connection search targets; and web pages relating to the new connection information "Battery Park", "Verizon Wireless", "American Express", "New York Stock Exchange", "Broadway", "South Street Seaport Museum", "LaGuardia Airport", and "New York Mets", obtained with the forward action method wherein the connection information "Trinity Church", "NBC", "Financial District", "Millennium Broadway Hotel", "Nasdaq Stock Exchange", "Museum of Modern Art", and "Queens" are each connection search targets.

With the starting series in FIG. 26, web pages relating to the new connection information "Battery Park" is found with a forward action method using the connection information "Trinity Church" as a connection search target.

Also, with the starting series in FIG. 26, web pages relating to the new connection information "American Express" and "New York Mercantile Exchange" is found with a forward action method using the connection information "World Trade Center" as a connection search target.

Further, with the starting series in FIG. 26, web pages relating to the new connection information "New York Stock Exchange" is found with a forward action method using the connection information "NBC" and "Nasdaq Stock Exchange" as a connection search target.

Also, with the starting series in FIG. 26, web pages relating to the new connection information "Broadway" is found with a forward action method using the connection information "Nasdaq Stock Exchange" as a connection search target.

Further, with the starting series in FIG. 26, web pages relating to the new connection information "South Street Seaport Museum" is found with a forward action method using the connection information "Museum of Modern Art" as a connection search target, and web pages relating to the new connection information "LaGuardia Airport" and "New York Mets" is found with a forward action method using the connection information "Queens" as a connection search target.

With the starting series in FIG. 26, the connection information "Battery Park", "Verizon Wireless", "New York Stock Exchange", and "South Street Seaport Museum" is matching information since these exist in the goal series, and in the starting information processing which follows, each of "Battery Park", "Verizon Wireless", "New York Stock Exchange", and "South Street Seaport Museum" is used as a connection search target, whereby new connection information is found with the forward action method.

With the starting series, upon the goal information "Lower Manhattan" being found as connection information, the starting information processing unit 91 (FIG. 19) outputs a starting series including the connection information "Lower Manhattan" as an action plan that includes the starting information "Central Park" and the goal information "Lower Manhattan", whereby the starting information processing is ended.

Thus, with the information processing device 11 (FIG. 1), the user uses an action model wherein the manner of obtaining, from input information, to obtain related information that relates to the input information is modeled, and finds connection information to connect the starting information and goal information, whereby connections between the starting information and goal information are searched, and therefore appropriate connections for the two pieces of information of the starting information and goal information can be searched.

That is to say, connection information is found using an action model wherein search actions, link actions, and keyword actions performed by an undetermined large number of users are modeled, whereby the know-how of manners of searching by other users regarding connections between the starting information and goal information can be utilized, whereby appropriate connections that reflect the thought process at the time of performing actions of many users can be used for searching, and whereby the connections thereof become easy to understand.

Also, if a user searches for a connection between the starting information and the goal information using a search engine, for example, the user performs searches with the search engine by selecting search text strings in a trial-and-error manner, or selects links on a web pages obtained as a result of the search and viewing the web pages of such link destinations becomes time-consuming, but according to the information processing device 11, such problems can be reduced.

Further, according to the information processing device 11, information can be obtained which cannot be directly obtained simply by providing a search text string to a search engine.

That is to say, for example, connection information such as restaurants that can be visited while traveling between a certain location (e.g. Central Park) and another location (e.g. Lower Manhattan), or a connection between two apparently unrelated people (e.g. Norman Rockwell and Humphrey Bogart), companies (e.g. American Express, which is famous in the financial field and Verizon, which is famous in the telecommunications field), or fields of study (e.g. neurology and quantum physics, etc) can be searched.

With the present Specification, the processing steps described for the program to perform various types of processing with the computer (CPU 32 (FIG. 2)) are not restricted to being performed in a time-series manner in the order described in the flowcharts, and include processing executed in parallel or individually (e.g. parallel processing or object processing).

Also, the program may be arranged to be processed with one computer, or may be arranged to be distributed and executed among multiple computers. Further, the program may be arranged to be transferred to a distant computer and executed.

Note that embodiments of the present invention are not to be limited to the above-described embodiments, but various types of modifications may be made within the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a computer having a processor, the computer including:
obtaining means for obtaining two pieces of information that are targets for searching for connections;
connection searching means for using an action model wherein the manner of obtaining, from input information, to obtain related information that relates to the input information is modeled, and find connection information to connect said two pieces of information, thereby searching connections between said two pieces of information; and
search result output means for outputting the search results of the connections between said two pieces of information,
wherein said connection searching means repeatedly finds new connection information that connects to said connection information, with the information obtained by said obtaining means set as an initial value of said connection information, whereby a series of said connection information including said two pieces of information is searched as connections between said two pieces of information, and
wherein, in the case that one of said two pieces of information is set as starting information which is the information at the start of the connections and the other is set as goal information which is the information at the goal of the connections, said connections searching means further comprises:
starting information processing means for performing starting information processing configuring a starting series which is a series of said connection information including said starting information, by finding new connection information that connects to said connection information with said starting information as an initial value of said connection information;
goal information processing means for performing goal information processing configuring a goal series which is a series of said connection information including said goal information, by finding new connection information that connects to said connection information with said goal information as an initial value of said connection information; and
matching determining means for determining whether said new connection information of one of the series of said starting series and goal series is matching information that matches one of said connection information configuring the other series of said starting series and series;
wherein said starting information processing means or said goal information processing means finds said new connection information to connect to the connection search target, wherein said connection information that has become said matching information serves as a connection search target to find said new connection information, and output said starting series when said connection information having become said matching information is said goal information, or said goal series when said connection information having become said matching information is said starting information, as a series of said connection information including said starting information and goal information.

2. The information processing device according to claim 1 wherein as said starting information processing, said starting information processing means find said related information obtained from said action model when said connection information is set as said input information, so as to be said new connection information, with said starting information as an initial value of said connection information;
wherein as said goal information processing, said goal information processing means find said input information when said connection information is obtained from said action model as said related information, so as to be said new connection information, with said goal information as an initial value of said connection information; and
wherein said starting information processing means find said new connection information that connects to the connection search target, with said connection information having become said matching information serving as the connection search target that finds said new connection information.

3. The information processing device according to claim 1 wherein as said starting information processing, said starting information processing means find said related information obtained from said action model when said connection information is set as said input information, so as to be said new connection information, with said starting information as an initial value of said connection information;

as said goal information processing, said goal information processing means find said related information obtained from said action model when said connection information is set as said input information, so as to be said new connection information, with said goal information as an initial value of said connection information; and wherein said starting information processing means and goal information processing means find said new connection information that connects to the connection search target, said connection information having become said matching information serving as the connection search target that finds said new connection information.

4. The information processing device according to claim 1 wherein said starting information processing means or said goal information processing means find new connection information that connects to said connection information, using said action model, and in the case that said new connection information cannot be found using said action model, said new connection information is found using an external search engine or an external database.

5. The information processing device according to claim 1 wherein said connection searching means finds said connection information using a search action model wherein a manner of obtaining to obtain a web page is modeled by searching a web page from a keyword and a keyword action model wherein a manner of obtaining to obtain information serving as a search keyword from information on a web page is modeled.

6. The information processing device according to claim 5, further comprising:

search action model learning means for performing learning of said search action model, using historical data of user actions to obtain a web page, by searching for a web page from a keyword; and keyword action model learning means for performing learning of said keyword action model, using historical data of user actions to obtain information to serve as a search keyword, by selecting information to serve as a search keyword from information on a web page.

7. The information processing device according to claim 5 wherein said connection searching means find said connection information, also using a link action model wherein a manner of obtaining to obtain a web page at a link destination from a link on a web page is modeled.

8. The information processing device according to claim 7, further comprising link action model learning means to perform learning of said link action model, using historical data of user actions to obtain a web page at a link destination, by selecting a link on a web page.

9. The information processing device according to claim 1 wherein said connection searching means find said connection information, also using a link action model wherein a manner of obtaining to obtain a web page at a link destination from a link on a web page is modeled.

10. The information processing device according to claim 9, further comprising link action model learning means for performing learning of said link action model, using historical data of user actions to obtain a web page at a link destination, by selecting a link on a web page.

11. An information processing method for an information processing device to perform processing comprising the steps of:

obtaining two pieces of information that are targets for searching for connections;

searching for connections between said two pieces of information by a user using an action model wherein the manner of obtaining, from input information, to obtain related information that relates to the input information is modeled, and finding connection information to connect said two pieces of information; and outputting the search results of the connections between said two pieces of information, wherein in said searching for connections step repeatedly finding new connection information that connects to said connection information, with the information obtained in the obtaining step set as an initial value of said connection information, whereby a series of said connection information including said two pieces of information is searched as connections between said two pieces of information, and wherein, in the case that one of said two pieces of information is set as starting information which is the information at the start of the connections, and the other is set as goal information which is the information at the goal of the connections, said searching for connections step further comprises:

starting information processing configuring a starting series which is a series of said connection information including said starting information, by finding new connection information that connects to said connection information with said starting information as an initial value of said connection information;

goal information processing configuring a goal series which is a series of said connection information including said goal information, by finding new connection information that connects to said connection information with said goal information as an initial value of said connection information; and determining whether said new connection information of one of the series of said starting series and goal series is matching information that matches one of said connection information configuring the other series of said starting series and goal series;

wherein said starting information processing step or said goal information processing step find said new connection information to connect to the connection search target, wherein said connection information that has become said matching information serves as a connection search target to find said new connection information, and output said starting series when said connection information having become said matching information is said goal information, or said goal series when said connection information having become said matching information is said starting information, as a series of said connection information including said starting information and goal information.

12. A non-transitory computer readable medium having stored thereon a program to cause a computer to function as:

obtaining means to obtain two pieces of information that are targets for searching for connections;

connection searching means to use an action model wherein the manner of obtaining, from input information, to obtain related information that relates to the input information is modeled, and find connection information to connect said two pieces of information, thereby searching connections between said two pieces of information; and search result output means to output the search results of the connections between said two pieces of information, wherein in said searching for connections step repeatedly finding new connection information that connects to said connection information, with the information obtained in the obtaining step set as an initial value of said connection information, whereby a series of said connection information including said two pieces of information is searched as connections between said two pieces of information, and wherein, in the case that one of said two pieces of information is set as starting information which is the information at the start of the connections, and the other is set as goal information which is the information at the goal of the connections, said searching for connections step further comprises:

starting information processing configuring a starting series which is a series of said connection information including said starting information, by finding new connection information that connects to said connection information with said starting information as an initial value of said connection information;

goal information processing configuring a goal series which is a series of said connection information including said goal information, by finding new connection information that connects to said connection information with said goal information as an initial value of said connection information; and determining whether said new connection information of one of the series of said starting series and goal series is matching information that matches one of said connection information configuring the other series of said starting series and goal series, wherein said starting information processing step or said goal information processing step find said new connection information to connect to the connection search target, wherein said connection information that has become said matching information serves as a connection search target to find said new connection information, and output said starting series when said connection information having become said matching information is said goal information, or said goal series when said connection information having become said matching information is said starting information, as a series of said connection information including said starting information and goal information.

13. An information processing device comprising: a computer having a processor, the computer including: an obtaining unit configured to obtain two pieces of information that are targets for searching for connections; a connection searching unit configured to use an action model wherein the manner of obtaining, from input information, to obtain related information that relates to the input information is modeled, and find connection information to connect said two pieces of information, thereby searching connections between said two pieces of information; and a search result output unit configured to output the search results of the connections between said two pieces of information: wherein said connection searching unit repeatedly finds new connection information that connects to said connection information, with the information obtained by said obtaining unit set as an initial value of said connection information, whereby a series of said connection information including said two pieces of information is searched as connections between said two pieces of information, and wherein, in the case that one of said two pieces of information is set as starting information which is the information at the start of the connections, and the other is set as goal information which is the information at the goal of the connections, said connections searching unit further comprises: starting information processing unit for performing starting information processing configuring a starting series which is a series of said connection information including said starting information, by finding new connection information that connects to said connection information with said starting information as an initial value of said connection information: goal information processing unit for performing goal information processing configuring a goal series which is a series of said connection information including said goal information by finding new connection information that connects to said connection information with said goal information as an initial value of said connection information; and matching determining unit for determining whether said new connection information of one of the series of said starting series and goal series is matching information that matches one of said connection information configuring the other series of said starting series and goal series; wherein said starting information processing unit or said goal information processing unit finds said new connection information to connect to the connection search target wherein said connection information that has become said matching information serves as a connection search target to find said new connection information, and output said starting series when said connection information having become said matching information is said goal information or said goal series when said connection information having become said matching information is said starting information, as a series of said connection information including said starting information and goal information.

* * * * *